US010358990B2

(12) United States Patent
Stretch

(10) Patent No.: US 10,358,990 B2
(45) Date of Patent: Jul. 23, 2019

(54) STRATEGIES FOR RESONANCE MANAGEMENT

(71) Applicant: EATON INTELLIGENT POWER LIMITED, Dublin (IE)

(72) Inventor: Dale A. Stretch, Novi, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/763,400

(22) PCT Filed: Jun. 28, 2017

(86) PCT No.: PCT/US2017/039845
§ 371 (c)(1),
(2) Date: Mar. 26, 2018

(87) PCT Pub. No.: WO2018/005711
PCT Pub. Date: Jan. 4, 2018

(65) Prior Publication Data
US 2019/0107065 A1    Apr. 11, 2019

Related U.S. Application Data

(60) Provisional application No. 62/355,666, filed on Jun. 28, 2016.

(51) Int. Cl.
*F02D 41/00*    (2006.01)
*F02D 13/02*    (2006.01)
(Continued)

(52) U.S. Cl.
CPC ..... *F02D 41/0087* (2013.01); *F02D 13/0203* (2013.01); *F02D 13/06* (2013.01);
(Continued)

(58) Field of Classification Search
CPC .............. F02D 41/008; F02D 41/0087; F02D 41/3058; F02D 2041/0012; F02D 13/0203; F02D 13/06; F02D 17/00; F02D 17/02
(Continued)

(56) References Cited

U.S. PATENT DOCUMENTS 6,758,185 B2    7/2004    Surnilla et al.
6,978,204 B2    12/2005   Surnilla et al.
(Continued)

FOREIGN PATENT DOCUMENTS

WO    2013059365 A1    4/2013

OTHER PUBLICATIONS

International Search Report for PCT/US2017/039845 dated Sep. 20, 2017, pp. 1-6.
(Continued)

*Primary Examiner* — Erick R Solis
*Assistant Examiner* — Robert A Werner
(74) *Attorney, Agent, or Firm* — Mei & Mark, LLP

(57) ABSTRACT

Methods are provided for managing forcing function frequency profiles during operation of a multi-cylinder engine. A first stroke mode for a first cylinder is selected and comprises at least a sequential deactive operation of the opening and the closing of a first intake valve and a first exhaust valve during at least two reciprocations of a first reciprocating piston. The first stroke mode is operated on the first cylinder, a second stroke mode is operated on a second cylinder, and a third stroke mode is operated on the remaining cylinders to meet or exceed a required torque output and to form a first aggregate of forcing function frequency profiles that comprises primary forcing function frequency profiles that are less than or approximate in amplitude and less than or approximate in frequency value to one of the
(Continued)

respective baseline of primary forcing function frequency profiles.

35 Claims, 23 Drawing Sheets

(51) Int. Cl.
*F02D 13/06* (2006.01)
*F02D 17/02* (2006.01)
*F02D 41/30* (2006.01)
*F02D 41/38* (2006.01)
*F02D 41/14* (2006.01)

(52) U.S. Cl.
CPC ......... *F02D 17/02* (2013.01); *F02D 41/0002* (2013.01); *F02D 41/1497* (2013.01); *F02D 41/3058* (2013.01); *F02D 41/38* (2013.01); *F02D 2041/0012* (2013.01); *F02D 2041/389* (2013.01); *F02D 2200/1004* (2013.01)

(58) Field of Classification Search
USPC .......................................... 701/111; 123/481
See application file for complete search history.

(56) References Cited

U.S. PATENT DOCUMENTS

| | | | |
|---|---|---|---|
| 7,021,046 B2 | 4/2006 | Surnilla et al. | |
| 7,025,039 B2 | 4/2006 | Bidner et al. | |
| 7,047,932 B2 | 5/2006 | Surnilla et al. | |
| 7,063,062 B2 | 6/2006 | Lewis et al. | |
| 7,073,322 B2 | 7/2006 | Surnilla et al. | |
| 7,234,436 B2 | 6/2007 | Surnilla et al. | |
| 7,246,583 B2 | 7/2007 | Cinpinski et al. | |
| 7,255,066 B2 | 8/2007 | Lewis et al. | |
| 7,311,079 B2 | 12/2007 | Surnilla et al. | |
| 7,377,104 B2 | 5/2008 | Makki et al. | |
| 7,481,039 B2 | 1/2009 | Surnilla et al. | |
| 7,549,283 B2 | 6/2009 | Kerns et al. | |
| 7,577,511 B1 | 8/2009 | Tripathi et al. | |
| 7,849,835 B2 | 12/2010 | Tripathi et al. | |
| 7,886,715 B2 | 2/2011 | Tripathi et al. | |
| 7,954,474 B2 | 6/2011 | Tripathi et al. | |
| 8,099,224 B2 | 1/2012 | Tripathi et al. | |
| 8,131,445 B2 | 3/2012 | Tripathi et al. | |
| 8,131,447 B2 | 3/2012 | Tripathi et al. | |
| 8,145,410 B2 | 3/2012 | Berger et al. | |
| 8,336,521 B2 | 12/2012 | Tripathi et al. | |
| 8,402,942 B2 | 3/2013 | Tripathi et al. | |
| 8,464,690 B2 | 6/2013 | Yuille et al. | |
| 8,499,743 B2 | 8/2013 | Tripathi et al. | |
| 8,511,281 B2 | 8/2013 | Tripathi et al. | |
| 8,616,181 B2 | 12/2013 | Sahandiesfanjani et al. | |
| 8,646,435 B2 | 2/2014 | Dibble et al. | |
| 8,651,091 B2 | 2/2014 | Tripathi et al. | |
| 8,701,628 B2 | 4/2014 | Tripathi et al. | |
| 8,869,773 B2 | 10/2014 | Tripathi et al. | |
| 8,880,258 B2 | 11/2014 | Breton et al. | |
| 8,892,330 B2 | 11/2014 | Yuille et al. | |
| 9,020,735 B2 | 4/2015 | Tripathi et al. | |
| 9,086,024 B2 | 7/2015 | Tripathi et al. | |
| 9,399,964 B2 | 7/2016 | Younkins et al. | |
| 9,476,373 B2 | 10/2016 | Younkins et al. | |
| 9,541,050 B2 | 1/2017 | Tripathi et al. | |
| 9,556,811 B2 | 1/2017 | Wagh et al. | |
| 9,650,971 B2 | 5/2017 | Pirjaberi et al. | |
| 9,664,130 B2 | 5/2017 | Wilcutts et al. | |
| 9,689,327 B2 | 6/2017 | Younkins et al. | |
| 2003/0221655 A1 | 12/2003 | Surnilla et al. | |
| 2004/0206072 A1 | 10/2004 | Surnilla | |
| 2005/0009666 A1* | 1/2005 | Dominici | F02D 41/008 477/107 |
| 2005/0131618 A1* | 6/2005 | Megli | F02D 13/0215 701/101 |
| 2005/0193718 A1 | 9/2005 | Surnilla | |
| 2005/0193719 A1 | 9/2005 | Sumilla | |
| 2005/0193988 A1 | 9/2005 | Bidner | |
| 2005/0197759 A1 | 9/2005 | Surnilla | |
| 2005/0197761 A1 | 9/2005 | Bidner | |
| 2005/0268880 A1 | 12/2005 | Bidner et al. | |
| 2005/0284132 A1 | 12/2005 | Makki et al. | |
| 2005/0284133 A1 | 12/2005 | Kerns et al. | |
| 2006/0030998 A1 | 2/2006 | Surnilla et al. | |
| 2006/0154784 A1 | 7/2006 | Surnilla et al. | |
| 2006/0162320 A1 | 7/2006 | Surnilla et al. | |
| 2006/0231061 A1 | 10/2006 | Lewis et al. | |
| 2008/0154468 A1 | 6/2008 | Berger et al. | |
| 2010/0006065 A1 | 1/2010 | Tripathi et al. | |
| 2010/0010724 A1 | 1/2010 | Tripathi et al. | |
| 2010/0037857 A1 | 2/2010 | Tripathi et al. | |
| 2010/0050985 A1 | 3/2010 | Tripathi et al. | |
| 2010/0050986 A1 | 3/2010 | Tripathi et al. | |
| 2010/0100299 A1 | 4/2010 | Tripathi et al. | |
| 2011/0030657 A1 | 2/2011 | Tripathi et al. | |
| 2011/0048372 A1 | 3/2011 | Dibble et al. | |
| 2011/0208405 A1 | 8/2011 | Tripathi et al. | |
| 2011/0213540 A1 | 9/2011 | Tripathi et al. | |
| 2011/0213541 A1 | 9/2011 | Tripathi et al. | |
| 2011/0251773 A1 | 10/2011 | Sahandiesfanjani et al. | |
| 2012/0109495 A1 | 5/2012 | Tripathi et al. | |
| 2012/0143471 A1 | 6/2012 | Tripathi et al. | |
| 2013/0066502 A1 | 3/2013 | Yuille et al. | |
| 2013/0096758 A1 | 4/2013 | Yuille et al. | |
| 2013/0096759 A1 | 4/2013 | Breton et al. | |
| 2013/0118443 A1 | 5/2013 | Tripathi et al. | |
| 2013/0298870 A1 | 11/2013 | Tripathi et al. | |
| 2014/0041625 A1 | 2/2014 | Pirjaberi et al. | |
| 2014/0172272 A1 | 6/2014 | Tripathi et al. | |
| 2014/0278007 A1 | 9/2014 | Wilcutts et al. | |
| 2015/0267674 A1 | 9/2015 | Tripathi et al. | |
| 2015/0369140 A1 | 12/2015 | Wagh et al. | |
| 2016/0003177 A1* | 1/2016 | Aikawa | F02D 17/00 123/339.14 |
| 2016/0040614 A1 | 2/2016 | Younkins et al. | |
| 2016/0131058 A1 | 5/2016 | Younkins et al. | |
| 2016/0201586 A1* | 7/2016 | Serrano | F02D 41/307 701/111 |
| 2016/0281618 A1 | 9/2016 | Younkins et al. | |
| 2016/0363062 A9 | 12/2016 | Pirjaberi et al. | |
| 2016/0377007 A9 | 12/2016 | Wilcutts et al. | |

OTHER PUBLICATIONS

Written Opinion of the International Searching Authority for PCT/US2017/039845 dated Sep. 20, 2017, pp. 1-8.

\* cited by examiner

STRATEGIES FOR RESONANCE MANAGEMENT

This is a § 371 National Stage entry of Application No. PCT/US2017/039845, filed Jun. 28, 2017, and claims the benefit of U.S. provisional application No. 62/355,666, filed Jun. 28, 2016, all of which are incorporated herein by reference.

FIELD

This application provides strategies for managing resonance during engine operation.

BACKGROUND

It is desired to operate an engine in a cylinder deactivation mode ("CDA") for purposes such as improving brake thermal efficiency or improving aftertreatment or exhaust conditions. But, a long felt impediment to implementing CDA has been the presence of torsionals and other noise vibration harshness (NVH) that are outside those that a standard operation engine and associated device are designed for. It is desired to implement a strategy for CDA that addresses the NVH issues.

SUMMARY

The methods disclosed herein overcome the above disadvantages and improves the art by way of stroke strategies for managing harmonics during engine operation.

Methods are provided for managing forcing function frequency profiles during operation of a multi-cylinder engine, each cylinder of the engine comprising a respective variable cylinder torque output which provides a corresponding forcing function frequency profile. The engine comprises a variable aggregate torque output that varies based on RPM, fuel injection, active operation mode or deactive mode, etc. The aggregate torque output comprises the sum of the cylinder torque outputs of each of the cylinders and comprises the sum of the forcing function frequency profiles of each of the cylinders. The engine comprises a respective baseline aggregate torque output for each nonzero reciprocation speed of a reciprocating piston assembly coupled to the cylinders. Each respective baseline aggregate torque output provides a respective baseline of primary forcing function frequency profiles. The respective baseline aggregate torque output corresponds to active operation modes for each cylinder. Active operation modes comprise sequential actuation of an intake valve, a fuel injector, and an exhaust valve for each cylinder.

A method comprises selecting a first stroke mode for a first cylinder, the first stroke mode comprising at least a sequential deactive operation of the respective opening and respective closing of a corresponding first intake valve and a corresponding first exhaust valve during at least two reciprocations of a corresponding first reciprocating piston of the reciprocating piston assembly operating within the first cylinder. A method comprises selecting a second stroke mode for a second cylinder, the second stroke mode comprising at least a sequential active operation of the respective opening and respective closing of a corresponding second intake valve and a corresponding second fuel injector during at least a first reciprocation and during a second reciprocation of a corresponding second reciprocating piston of the reciprocating piston assembly operating within the second cylinder. Then, the method comprises operating the first stroke mode and the second stroke mode to form a first aggregate torque output that provides a sum of the forcing function frequency profiles of each of the cylinders that is less than or approximate in amplitude and approximate in frequency value to a first baseline of primary forcing function frequency profiles of a first baseline aggregate torque output.

The method can comprise operating the engine at a first reciprocation speed of the reciprocating piston assembly, wherein the first baseline aggregate torque output corresponds to an aggregate torque output of the engine at a second reciprocation speed of the reciprocating piston assembly.

The method can comprise the selected second stroke mode further comprising transitioning sequentially from the active operation of the corresponding second intake valve and the second fuel injector to a deactive operation of the respective opening and respective closing of a corresponding second exhaust valve and the second intake valve during a third reciprocation and during a fourth reciprocation of the second reciprocating piston, wherein the second exhaust valve does not open between the active operation of the second intake valve and the deactive operation of the second exhaust valve. The method can further comprise actively injecting fuel in to the second cylinder during the deactivate operation of the second exhaust valve and the second intake valve.

The method can comprise the selected first stroke mode further comprising sequentially transitioning from the sequential deactive operation on the at least two reciprocations of the first reciprocating piston to an active operation of the respective opening and respective closing of the first exhaust valve on a subsequent reciprocation of the first reciprocating piston, wherein the sequential transitioning occurs without opening the first intake valve. The method can comprise combusting fuel in the first cylinder prior to the deactive operation of the first stroke mode, wherein the exhaust valve remains closed after the fuel combustion.

The methods can comprise actively injecting fuel in to the first cylinder during the deactivate operation of the first intake valve and the first exhaust valve.

The method can comprise the first reciprocating piston being associated with the second reciprocating piston to move in synchrony with the second reciprocating piston from a top dead center alignment within the reciprocating piston assembly to a bottom dead center alignment within the reciprocating piston assembly.

The method can comprise the first reciprocating piston being associated with the second reciprocating piston so that the first reciprocating piston moves from a top dead center alignment within the reciprocating piston assembly to a bottom dead center alignment within the reciprocating piston assembly as the second reciprocating piston moves from the bottom dead center alignment within the reciprocating piston assembly to the top dead center alignment within the reciprocating piston assembly.

The method can comprise operating the first stroke mode and the second stroke mode to form a first aggregate torque output further comprises offsetting a first cylinder torque output of the first cylinder from a second cylinder torque output of the second cylinder so that a primary amplitude of the forcing function frequency profile of the first cylinder torque output does not coincide with a primary amplitude of the forcing function frequency profile of the second cylinder torque output.

The method can comprise operating the first stroke mode and the second stroke mode to form a first aggregate torque output comprises overlapping a first cylinder torque output of the first cylinder with a second cylinder torque output of the second cylinder so that a primary amplitude of the forcing function frequency profile of the first cylinder torque output coincides with a primary amplitude of the forcing function frequency profile of the second cylinder torque output.

The method can comprise the cylinders of the engine divided in to at least a first set of cylinders and a second set of cylinders, wherein the first cylinder is in the first set of cylinders, wherein all cylinders in the first set of cylinders follow a same first firing sequence, wherein the second cylinder is in the second set of cylinders, wherein all cylinders in the second set of cylinders follow a same second firing sequence. The method can comprise operating the second stroke mode to provide a larger forcing function frequency profile for each cylinder in the second set of cylinders than the forcing function frequency profile for each cylinder in the first set of cylinders by implementing a second firing sequence that combusts fuel during the deactive operation of the first stroke mode.

The method can comprise operating the second stroke mode to transition from the active operation of the respective opening and the respective closing of the corresponding second intake valve to a deactive operation of the respective opening and the respective closing of the corresponding second intake valve. And, the method can comprise operating the first stroke mode to provide a larger forcing function frequency profile for each cylinder in the first set of cylinders than the forcing function frequency profile for each cylinder in the second set of cylinders by implementing a first firing sequence that combusts fuel during the deactive operation of the second stroke mode.

The method can comprise operating the second stroke mode to transition from the active operation of the respective opening and the respective closing of the corresponding second intake valve to a deactive operation of the respective opening and the respective closing of the corresponding second intake valve. And, the method can comprise operating the first stroke mode to provide a larger forcing function frequency profile for each cylinder in the first set of cylinders than the forcing function frequency profile for each cylinder in the second set of cylinders by implementing a first firing sequence that combusts fuel prior to the deactive operation of the second stroke mode.

The method can comprise the cylinders of the engine divided in to at least a first set of cylinders and a second set of cylinders, wherein the first cylinder is in the first set of cylinders, wherein all cylinders in the first set of cylinders follow a same first firing sequence, wherein the second cylinder is in the second set of cylinders, wherein all cylinders in the second set of cylinders follow a same second firing sequence, wherein a stroke comprises one half of a reciprocation of the corresponding reciprocating piston. The method can comprise operating the first stroke mode to provide an 8-stroke first firing sequence wherein the corresponding intake valve is opened and closed on a first stroke, wherein the corresponding fuel injector is deactivated on the first stroke through a third stroke, wherein the corresponding fuel injector is activated on a fourth stroke, wherein the corresponding exhaust valve is held closed from the first stroke until the eighth stroke, wherein the corresponding exhaust valve is opened and closed on the eighth stroke, and wherein the corresponding intake valve is held closed from the second stroke through the eighth stroke. And, the method can comprise operating the second stroke mode to provide an 8-stroke second firing sequence identical to the first firing sequence. Also, the method can comprise timing the second stroke mode to provide the second firing sequence so that the second stroke of the second firing sequence occurs during the sixth stroke of the first firing sequence. The method can comprise activating the corresponding fuel injector on the sixth stroke of first firing sequence.

The method can comprise the cylinders of the engine divided in to at least a first set of cylinders and a second set of cylinders, wherein the first cylinder and a third cylinder are in the first set of cylinders, wherein the first cylinder and the third cylinder follow a same first firing sequence, wherein the second cylinder is in the second set of cylinders, wherein all cylinders in the second set of cylinders follow a same second firing sequence, and wherein a stroke comprises one half of a reciprocation of the corresponding reciprocating piston. The method can comprise configuring the first stroke mode to provide a 12-stroke first firing sequence wherein the corresponding intake valve is opened and closed on a first stroke, wherein the corresponding fuel injector is deactivated on the first stroke through a fifth stroke, wherein the corresponding fuel injector is activated on a sixth stroke, wherein the corresponding exhaust valve is held closed from the first stroke through an eleventh stroke, wherein the corresponding exhaust valve is opened and closed on a twelfth stroke, and wherein the corresponding intake valve is held closed from the second stroke through the twelfth stroke. The method can comprise timing the operation of the first stroke mode on the first cylinder and on the third cylinder so that the first stroke of the first stroke mode of the third cylinder occurs during the seventh stroke of the first stroke mode of the first cylinder. The method can comprise configuring the second stroke mode on the second cylinder to provide a 4-stroke second firing sequence wherein the corresponding second intake valve opens and closes on a first stroke, the fuel injector is activated on the second stroke, and the corresponding second exhaust valve opens and closes on the fourth stroke. And, the method can comprise timing the operation of the second stroke mode to provide the second firing sequence so that the second stroke of the second firing sequence occurs between the sixth stroke of the first firing sequence of the first cylinder and the second stroke of the first firing sequence of the third cylinder. The method can comprise activating the corresponding fuel injector on one or both of an eighth stroke and a tenth stroke.

The method can comprise the cylinders of the engine divided in to at least a first set of cylinders and a second set of cylinders, wherein the first cylinder is in the first set of cylinders, wherein all cylinders in the first set of cylinders follow a same first firing sequence, wherein the second cylinder is in the second set of cylinders, wherein all cylinders in the second set of cylinders follow a same second firing sequence, and wherein a stroke comprises one half of a reciprocation of the corresponding reciprocating piston. The method can comprise operating the first stroke mode to provide an 8-stroke first firing sequence wherein the corresponding intake valve is opened and closed on a first stroke, wherein the corresponding fuel injector is deactivated on the first stroke through a fifth stroke and on a seventh stroke through an eighth stroke, wherein the corresponding fuel injector is activated on a sixth stroke, wherein the corresponding exhaust valve is held closed from the first stroke until the eighth stroke, wherein the corresponding exhaust valve is opened and closed on the eighth stroke, and wherein the corresponding intake valve is held closed from the second stroke through the eighth stroke. The method can comprise operating the second stroke mode to provide a 4-stroke second firing sequence wherein the corresponding second intake valve opens and closes on a first stroke, the fuel injector is activated on the second stroke, and the corresponding second exhaust valve opens and closes on the fourth stroke. The method can comprise timing the second stroke mode to provide the second firing sequence so that the fourth stroke of the second firing sequence occurs during the sixth stroke of the first firing sequence.

The method can comprise the cylinders of the engine divided in to at least a first set of cylinders and a second set of cylinders, wherein the first cylinder and a third cylinder are in the first set of cylinders, wherein the first cylinder and the third cylinder follow a same first firing sequence, wherein the second cylinder is in the second set of cylinders, wherein all cylinders in the second set of cylinders follow a same second firing sequence, and wherein a stroke comprises one half of a reciprocation of the corresponding reciprocating piston. The method can comprise configuring the first stroke mode to provide a 16-stroke first firing sequence wherein the corresponding intake valve is opened and closed on a first stroke, wherein the corresponding fuel injector is deactivated on the first stroke through a ninth stroke, wherein the corresponding fuel injector is activated on a tenth stroke, wherein the corresponding exhaust valve is held closed from the first stroke through a fifteenth stroke, wherein the corresponding exhaust valve is opened and closed on the sixteenth stroke, and wherein the corresponding intake valve is held closed from the second stroke through the sixteenth stroke. The method can comprise timing the operation of the first stroke mode on the first cylinder and on the third cylinder so that the first stroke of the first stroke mode of the third cylinder occurs during the eleventh stroke of the first stroke mode of the first cylinder. The method can comprise configuring the second stroke mode on the second cylinder to provide a 4-stroke second firing sequence wherein the corresponding second intake valve opens and closes on a first stroke, the fuel injector is activated on the second stroke, and the corresponding second exhaust valve opens and closes on the fourth stroke. And, the method can comprise timing the operation of the second stroke mode to provide the second firing sequence so that the second stroke of the second firing sequence occurs between the fifteenth stroke of the first firing sequence of the first cylinder and the first stroke of the first firing sequence of the third cylinder. The method can comprise activating the corresponding fuel injector on one or both of a twelfth stroke and a fourteenth stroke.

The method can comprise opening the corresponding first intake valve and boosting a cylinder pressure for the first cylinder prior to entering the deactive operation of the first stroke mode.

The method can comprise executing a variable valve timing event on one or both of the corresponding first intake valve or the corresponding first exhaust valve for the first cylinder prior to entering the deactive operation of the first stroke mode.

The method can comprise adjusting a first quantity of fuel used at the first reciprocation speed for the first stroke mode and for the second stroke mode to be more efficient than a second quantity of fuel used at the first reciprocation speed for generating a baseline aggregate torque output.

Another method for managing forcing function frequency profiles during operation of a multi-cylinder engine can comprise selecting a first stroke mode for the cylinders, the first stroke mode comprising at least a sequential deactive operation of a respective opening and a respective closing of a corresponding first intake valve and a corresponding first exhaust valve during at least two reciprocations of a corresponding reciprocating piston of the reciprocating piston assembly operating within the cylinders. The method can comprise injecting fuel in to the cylinders during the deactive operation. The method can comprise timing the operating of the first stroke mode on the cylinders to form a first aggregate torque output that provides a sum of the forcing function frequency profiles of each of the cylinders that is less than or approximate in amplitude and approximate in frequency value to a first baseline of primary forcing function frequency profiles of a first baseline aggregate torque output.

The method can comprise the cylinders of the engine divided in to at least a first set of cylinders comprising a first cylinder and a second set of cylinders comprising a second cylinder, wherein all cylinders in the first set of cylinders follow the first firing sequence, wherein all cylinders in the second set of cylinders follow the first firing sequence, and wherein a stroke comprises one half of a reciprocation of the corresponding reciprocating piston. The method can comprise configuring a first stroke mode on the first cylinder and on the second cylinder to to provide an 8-stroke first firing sequence wherein the corresponding intake valve is opened and closed on a first stroke, wherein the corresponding fuel injector is deactivated on the first stroke through a third stroke, wherein the corresponding fuel injector is activated on a fourth stroke, wherein the corresponding exhaust valve is held closed from the first stroke until the eighth stroke, wherein the corresponding exhaust valve is opened and closed on the eighth stroke, and wherein the corresponding intake valve is held closed from the second stroke through the eighth stroke. The method can comprise timing the first stroke mode on the first cylinder and on the second cylinder to provide the first stroke of the first firing sequence of the second cylinder during a fifth stroke of the first firing sequence of the first cylinder operating the first stroke mode. The method can comprise activating the corresponding fuel injector on the sixth stroke of the first firing sequence.

The method can comprise the cylinders of the engine divided in to at least a first set of cylinders comprising a first cylinder and a second set of cylinders comprising a second cylinder, wherein all cylinders in the first set of cylinders follow the first firing sequence, wherein all cylinders in the second set of cylinders follow the first firing sequence, and wherein a stroke comprises one half of a reciprocation of the corresponding reciprocating piston. The method can comprise configuring a first stroke mode on the first cylinder and on the second cylinder to provide a 12-stroke first firing sequence wherein the corresponding intake valve is opened and closed on a first stroke, wherein the corresponding fuel injector is deactivated on the first stroke through a fifth stroke, wherein the corresponding fuel injector is activated on a sixth stroke, wherein the corresponding exhaust valve is held closed from the first stroke through an eleventh stroke, wherein the corresponding exhaust valve is opened and closed on the twelfth stroke, and wherein the corresponding intake valve is held closed from the second stroke through the twelfth stroke. The method can comprise timing the first stroke mode on the first cylinder and on the second cylinder to provide the first stroke of the first firing sequence of the second cylinder during the seventh stroke of the first firing sequence of the first cylinder. The method can comprise activating the corresponding fuel injector on one or both of the eighth stroke or the tenth stroke of the first firing sequence.

The method can comprise the cylinders of the engine divided in to at least a first set of cylinders comprising a first cylinder and a second set of cylinders comprising a second cylinder, wherein all cylinders in the first set of cylinders follow the first firing sequence, wherein all cylinders in the second set of cylinders follow the first firing sequence, and wherein a stroke comprises one half of a reciprocation of the corresponding reciprocating piston. The method can comprise configuring a first stroke mode on the first cylinder and on the second cylinder to provide a 16-stroke first firing sequence wherein the corresponding intake valve is opened and closed on a first stroke, wherein the corresponding fuel injector is deactivated on the first stroke through a ninth stroke, wherein the corresponding fuel injector is activated on a tenth stroke, wherein the corresponding exhaust valve is held closed from the first stroke through a sixteenth stroke, wherein the corresponding exhaust valve is opened and closed on the sixteenth stroke, and wherein the corresponding intake valve is held closed from the second stroke through the sixteenth stroke. And, the method can comprise timing the first stroke mode on the first cylinder and on the second cylinder to provide the first stroke of the first firing sequence of the second cylinder during the eleventh stroke of the first firing sequence of the first cylinder. The method can comprise activating the corresponding fuel injector on one or both of the twelfth stroke or the fourteenth stroke of the first firing sequence.

Another method for managing forcing function frequency profiles during operation of a multi-cylinder engine can comprise determining a required torque output for the operating engine. The method can comprise selecting a first stroke mode for a first cylinder, the first stroke mode comprising at least a sequential deactive operation of the respective opening and the respective closing of a corresponding first intake valve and a corresponding first exhaust valve during at least two reciprocations of a corresponding first reciprocating piston of the reciprocating piston assembly operating within the first cylinder. The method can comprise selecting a second stroke mode for a second cylinder, the second stroke mode comprising at least a sequential deactive operation of the respective opening and the respective closing of a corresponding second intake valve and a corresponding second exhaust valve during at least two reciprocations of a corresponding second reciprocating piston of the reciprocating piston assembly operating within the second cylinder. The method can comprise operating the first stroke mode on the first cylinder, the second stroke mode on the second cylinder, and at least a third stroke mode on the remaining cylinders to meet or exceed the required torque output and to form a first aggregate of forcing function frequency profiles that comprises primary forcing function frequency profiles that are less than or approximate in amplitude and less than or approximate in frequency value to one of the respective baseline of primary forcing function frequency profiles.

The method can comprise operating the first stroke mode on the first cylinder, the second stroke mode on the second cylinder, and at least a third stroke mode on the remaining cylinders at the same nonzero reciprocation speed of the reciprocating piston assembly as the one of the respective baseline of primary forcing function frequency profiles.

The method can comprise performing a charge intake operation on the second cylinder prior to operating the second stroke mode on the second cylinder; injecting fuel during the deactive operation of the first cylinder in the first stroke mode to increase a pressure pulse of the first cylinder; and timing the increased pressure pulse of the first cylinder to coincide with the performing of the charge intake operation on the second cylinder.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

DETAILED DESCRIPTION

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures.

Figure 1A:
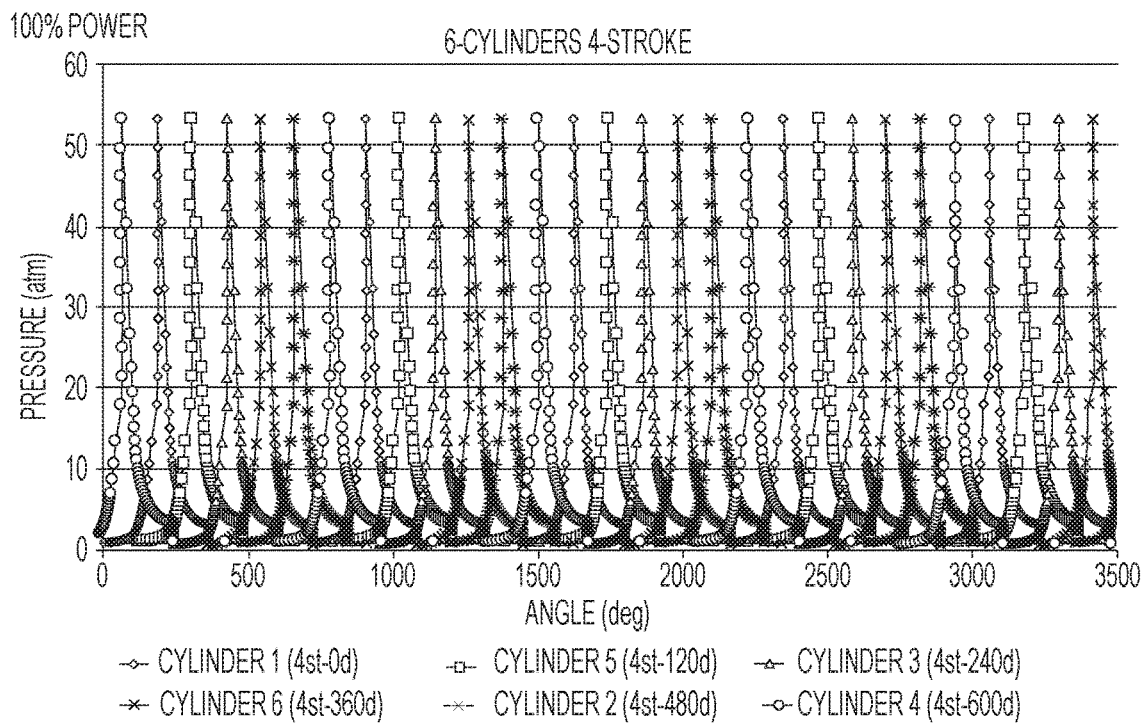
FIGS. 1A-1C are plots explaining a 6-cylinder, 4-stroke active operation mode.
Figure 1B:
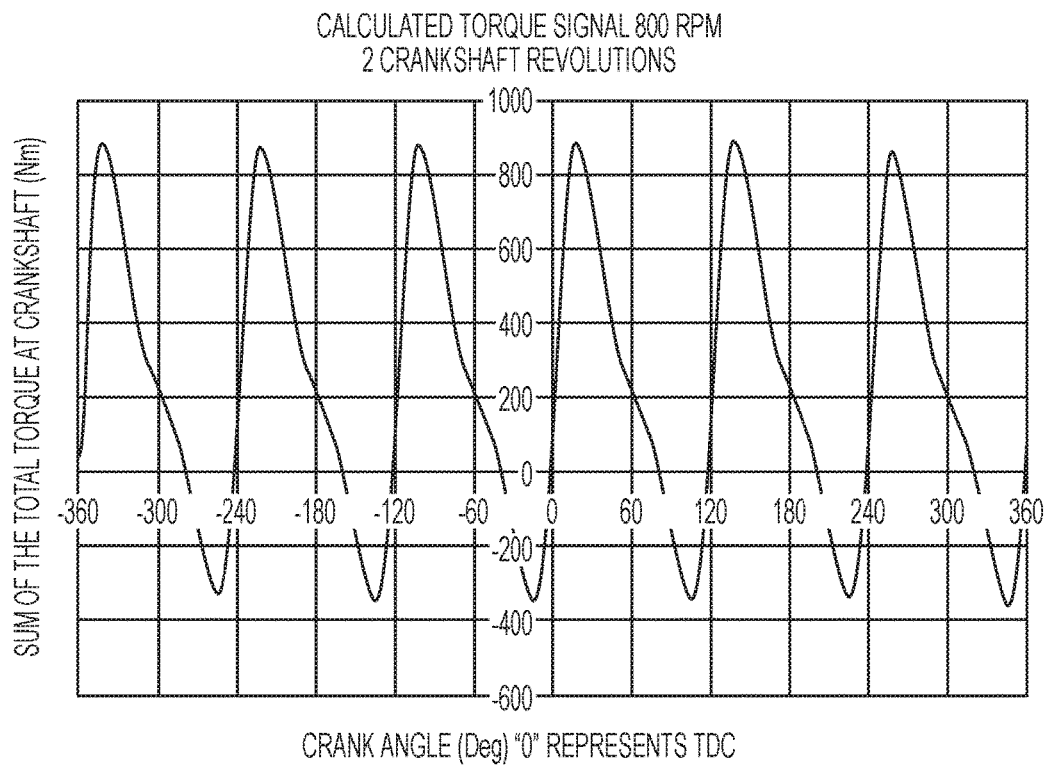
Figure 1C:
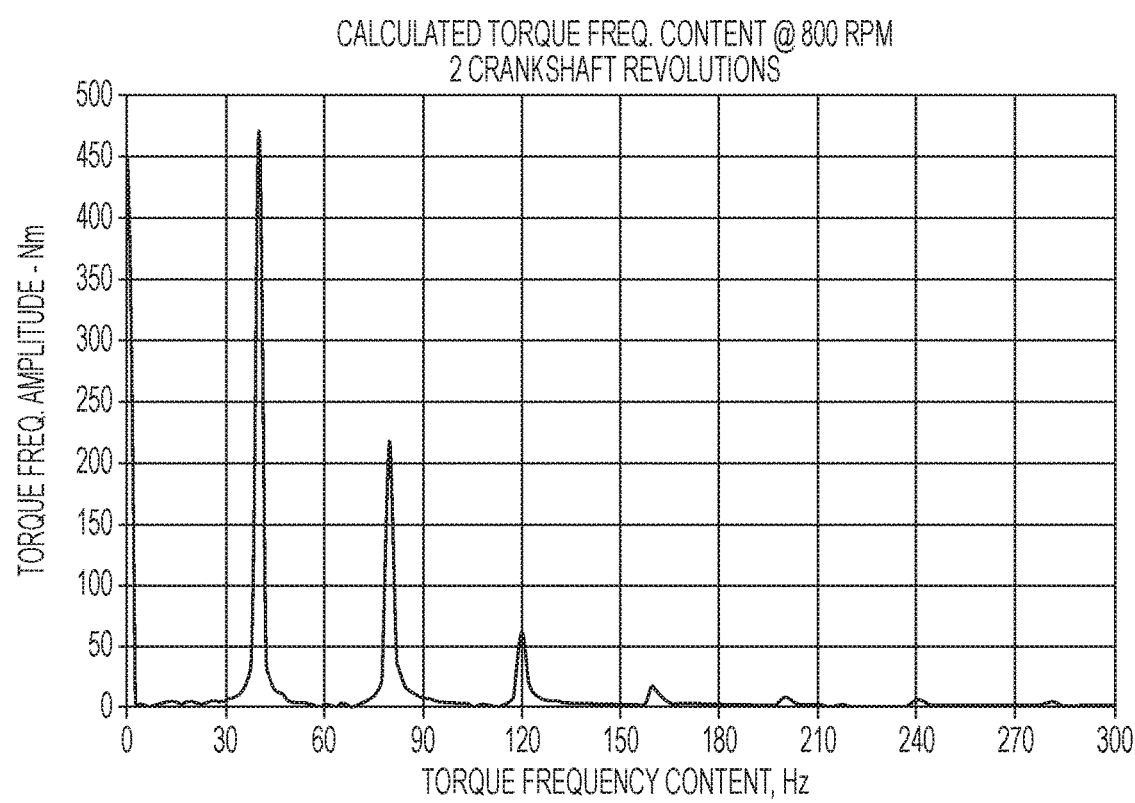

Turning to FIG. 1C, a baseline of primary forcing function frequency profiles is shown for a multi-cylinder engine at a reciprocation speed of 800 rotations per minute (RPM) of a reciprocating piston assembly coupled to the cylinders. The torque frequency content in Hertz (Hz) is plotted against the torque frequency amplitude in Newton-meters (Nm). In this example, a first order forcing function frequency profile occurs around 40 Hz at an amplitude of about 475 Nm. A second order forcing function frequency profile occurs around 80 Hz at an amplitude of about 225 Nm. A third order forcing function frequency profile occurs at about 120 Hz at an amplitude of about 60 Nm. The ordinals (first, second, third) are assigned based on the magnitude of the amplitude of the primary forcing function frequency profiles. Typically, only those forcing function frequencies capable of causing mechanical resonance are assigned an ordinal and considered "primary." And typically first through third and sometimes a "half order" NVH signature are considered "primary." Lesser disturbances and disturbances experienced during engine starting and stopping are not considered "primary" forcing function frequency profiles for the purpose of this disclosure.

Baselines of primary (first order, second order, and third order) forcing function frequency profiles result from the active operation of each cylinder in the engine in a standard operation mode, where active operation comprises sequential actuation of an intake valve, a fuel injector, and an exhaust valve for each cylinder, and wherein standard operation mode comprises combusting fuel in each cylinder according to a pattern of identical operation of each cylinder. As the rotations per minute of the crankshaft increase, the baseline primary forcing function frequency profiles typically increase in amplitude. The engine and vehicle are typically designed to handle the baselines for each crankshaft RPM that the engine operates at.

For example, in a 6-cylinder engine, a firing sequence for combusting fuel in an engine in standard operation mode can be to fire the six cylinders in the order 1, 5, 3, 6, 2, 4 as the crankshaft completes two revolutions. Completing two crankshaft revolutions completes one 4-stroke mode engine cycle. All cylinders have experienced the reciprocation of their associated pistons and have had at least an opportunity to fire. A firing sequence can also fire cylinders 1 & 5 together, then cylinders 3 & 6 together, then cylinders 2 & 4 together to complete one 4-stroke mode engine cycle, then repeat for subsequent engine cycles.

Each cylinder can output a cylinder torque output which provides a corresponding cylinder forcing function frequency profile that influences whether or not the engine, or associated devices, resonates at its natural frequency. The engine and associated devices are typically designed to avoid the deleterious effects of the mechanical resonance of the engine, and most vehicles are designed to avoid mechanical resonance during the standard operation of the engine.

Cylinder deactivation ("CDA"), where fuel injection is cut off and intake and exhaust valves are closed, provides fuel economy benefits, particularly when other cylinders in the engine are optimized for fuel use. However, the mechanical resonance of the engine, or the mechanical resonance of the associated vehicle, are impediments to the implementation of CDA. This is because the engine and vehicle are typically optimized for avoiding resonance during a standard operation mode of the engine. Yet, CDA can shift the forcing function frequency profiles that determine whether or not the engine or vehicle resonate. This means that CDA can cause resonance that is not designed for in standard operation mode. Prior attempts to solve this NVH issue have comprised attempting to "cancel out" or absorb the forcing function frequency profiles of the CDA stroke modes, as by providing additional dampers. But, it is found that it is more efficacious to select only those CDA stroke modes for which the engine and vehicle are designed to accept the forcing function frequency profiles and avoid deleterious resonance. This requires a strategic exclusion of many available CDA stroke modes in favor of CDA stroke modes that meet predetermined criteria. This can also comprise the strategic activation of the fuel injection to create a cylinder forcing function frequency profile where there ordinarily would be none in a CDA stroke mode. A deactive operation stroke mode can comprise this hybrid, where traditional CDA comprising deactivation of intake & exhaust valves and fuel injection is combined with a strategic fuel injection while the intake and exhaust valves remain closed.

Turning to FIGS. 3A-3C, 4A, & 4B, a schematic for an engine system 10 is shown. An engine 100 comprises 6 cylinders 1-6. Other numbers of cylinders can be used, but for discussion, 4 or 6 cylinders are illustrated. The cylinders 1-6 receive intake fluid, which is combustion gas, such as air, or air mixed with exhaust (exhaust gas recirculation "EGR"), from intake ports 133 in the engine block to provide intake fluid to the cylinders 1-6. In a diesel engine, the intake manifold has a vacuum except when the intake manifold is boosted. CDA is beneficial, because the cylinder can be closed. Fuel efficiency is gained by not drawing the piston down against the manifold vacuum. When the cylinder is deactivated, the crankshaft 101 has less resistance from the piston, and the crankshaft can output more torque from the firing cylinders. However, this benefit also introduces a forcing function frequency profile that is not present during non-CDA mode.

Fuel is injected to individual cylinders via a fuel injection controller 300. The fuel injection controller 300 can adjust the amount and timing of fuel injected in to each cylinder and can shut off and resume fuel injection to each cylinder. The fuel injection for each cylinder 1-6 can be the same or unique for each cylinder 106, such that one cylinder can have more fuel than another, and one cylinder can have no fuel injection, while others have fuel. The fuel injection controller 300 can control fuel injection to occur during a deactive CDA mode so as to impact the pressure pulses of that cylinder. This can introduce additional forcing function frequency profiles during the deactive mode.

A user input sensor 900 can be linked to the engine system 10 to sense user inputs such as braking, acceleration, start-up mode selection, shut-down mode selection, auxiliary device activation, among others. The user selections can impact the required torque output for the operating engine. So, the required torque output for the cylinders 1-6 of the operating engine can be adjusted in response to the user selections. The valve control by VVA controller 200 and fuel injection from fuel controller 300 can be tailored based on the user selections sensed by user input sensor 900.

A variable valve actuator (VVA) controller 200 also couples to the cylinders 1-6 to actuate intake valves 130 and exhaust valves 150. The VVA controller 200 can change the actuation of intake valves 130 and exhaust valves 150 so as to open or close the valves normally, early, or late, or combinations thereof, or cease operation of the valves. VVA controller 200 can cooperate with a valve actuator 185, such as a hydraulic, electric, or electric solenoid system to control the intake and exhaust valves 130, 150. The valve actuators 185 for each cylinder 1-6 can be the same for all cylinders 106, thus enabling each valve of each cylinder to switch stroke modes, and switch between deactivate mode and active mode. Or, the valve actuators 185 can differ between the intake valves 130 and the exhaust valves 150, so that certain functionality is only enabled on one or the other of those valves. Or, commensurate with below discussions, the functionality can be distributed so that some valves can switch between deactive mode and activate mode, while others can only operate in active mode. And, when more than one intake valve or more than one exhaust valve are used per cylinder 106, the valve actuators 185 can be the same or different for each of those valves.

Figure 3A:
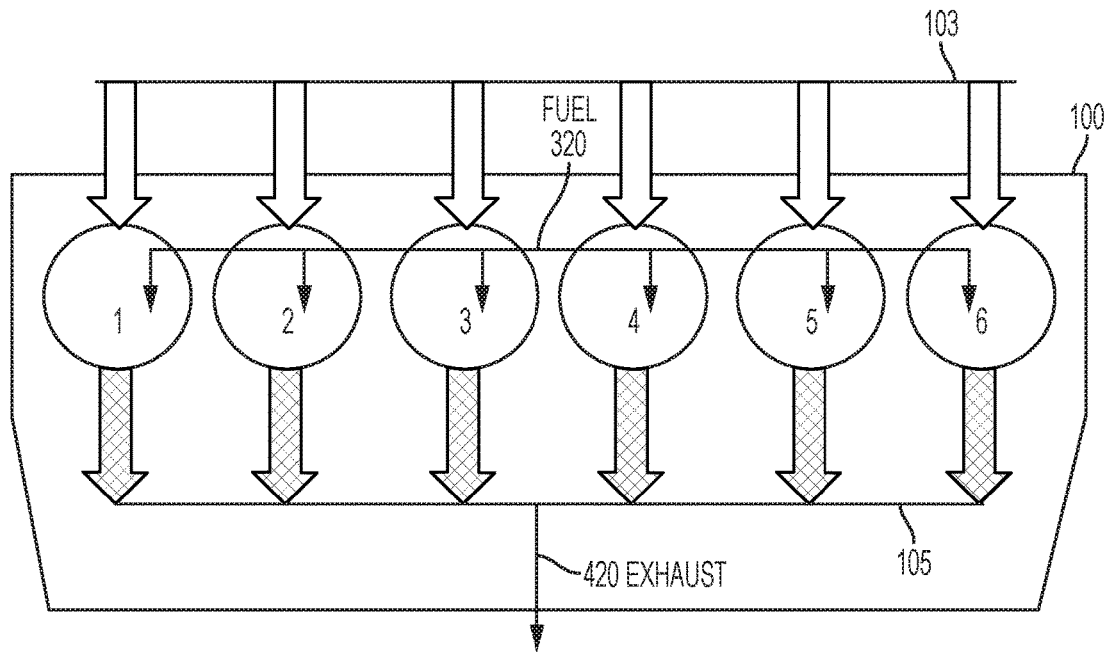
FIGS. 3A-3C are examples of active and deactive operation modes for a 6-cylinder engine.
Figure 3B:
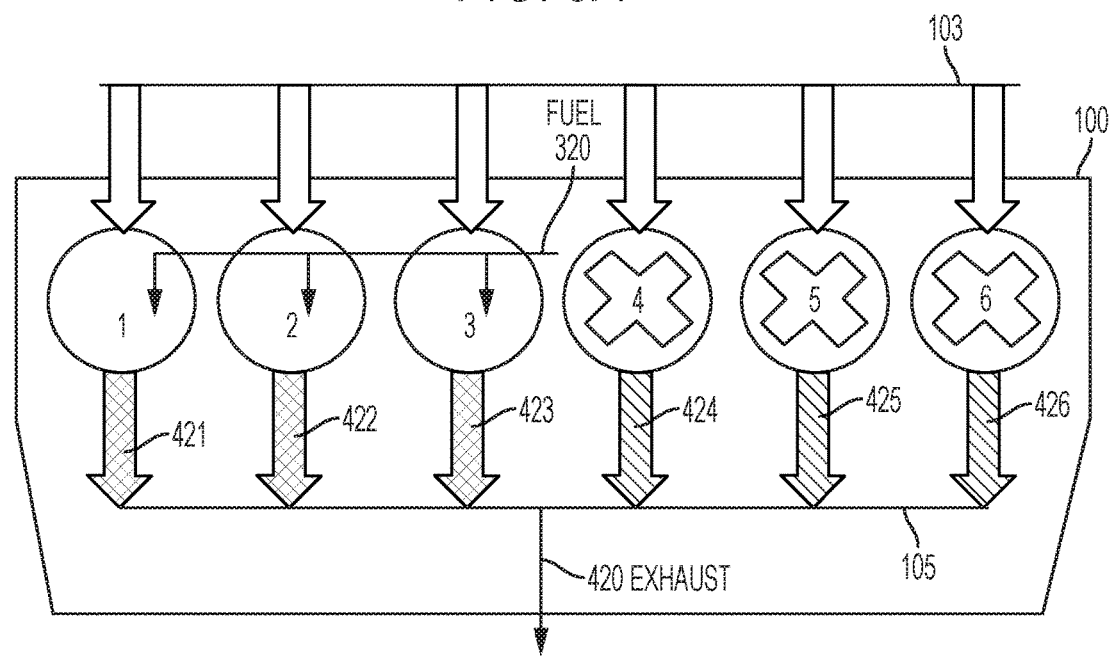

For example, as shown in FIG. 3A, intake fluid is supplied via an intake manifold to each cylinder 1-6. Fuel 320 is injected by fuel injector 310 to each of the cylinders 1-6. Exhaust 420 leaves an exhaust manifold. This all-cylinder operation mode can be enabled by a variety of valve actuators 185. In FIG. 3B, half of the engine 100 does not receive fuel 320. Deactive mode in the engine can comprise inhibiting fuel injection to some cylinders, or the affirmative deactivation of fuel injection. Each exhaust streams 421-426 can differ from having different quantities of fuel 320 injected, or as by having different periods for combustion enabled via valve actuators 185. For example, cylinders 4-6 could have late intake valve closing (LIVC) enabled to impact the air fuel ratio of that cylinder. The other active operation cylinders 1-3 could have increased fueling, but normal valve actuation. The resulting exhaust streams 421-423 differ from exhaust streams 424-426. Cylinders 5 could have fuel injected during its deactive operation to generate a strategic forcing function frequency profile with respect to the cylinders 4 & 6 so as to provide a sum of forcing function frequency profiles that replicate to some extent primary forcing function frequency profiles of baseline operation modes. Exhaust stream 425 can then differ from exhaust streams 424 & 426. could be compression release braked, and the exhaust streams 424-426 therefor differ from exhaust streams 421-423.

Figure 3C:
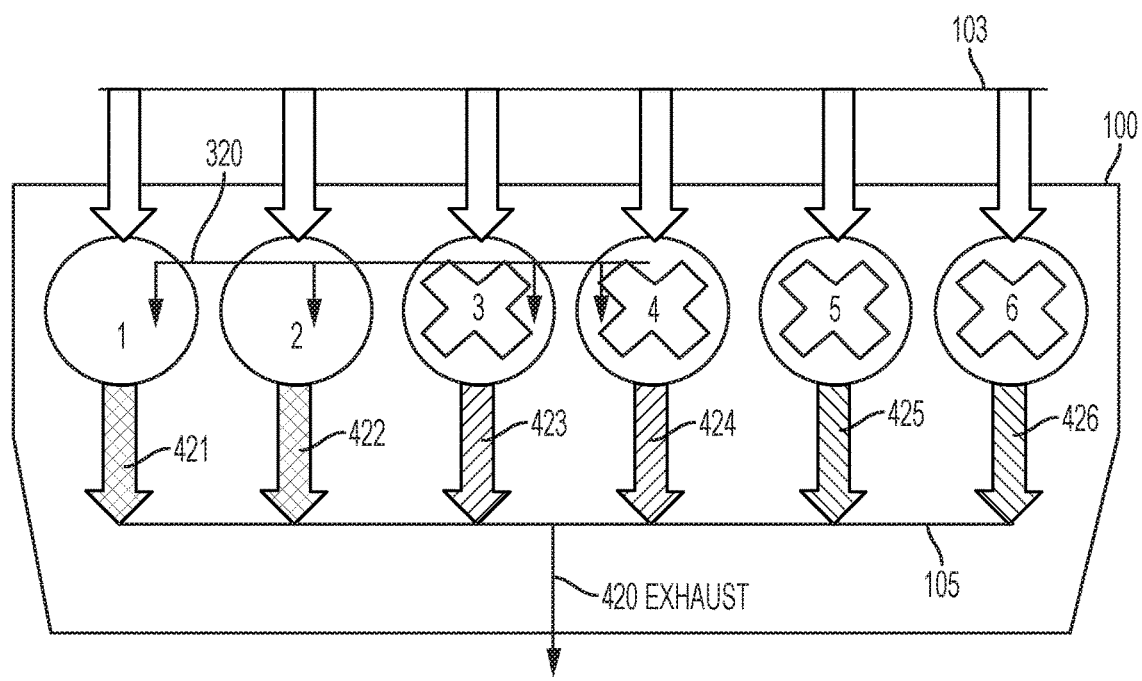

In FIG. 3C, combustion exhaust streams 421, 422 differ from deactive operation exhaust streams 423-426. Among the deactive operation exhaust streams 423-426, exhaust streams 423 & 424 can differ from exhaust streams 425 & 426 due to disparate stroke modes, fuel injections, boost conditions, valve timings, among others. Cylinders 1 & 2 of FIG. 3C receive fuel 320 and can function with a "standard mode," or active operation mode, comprising sequential actuation of an intake valve, a fuel injector, and an exhaust valve for each cylinder. Two disparate exhaust streams on the deactive operation cylinders can result from the use of disparate stroke modes on the cylinder pairs, or the result can be from the use of identical stroke modes on the cylinder pairs, but the stroke modes can be timed with respect to each other such that the deactive operation cylinders enter and exit deactive status at different times than each other.

Figure 4A:
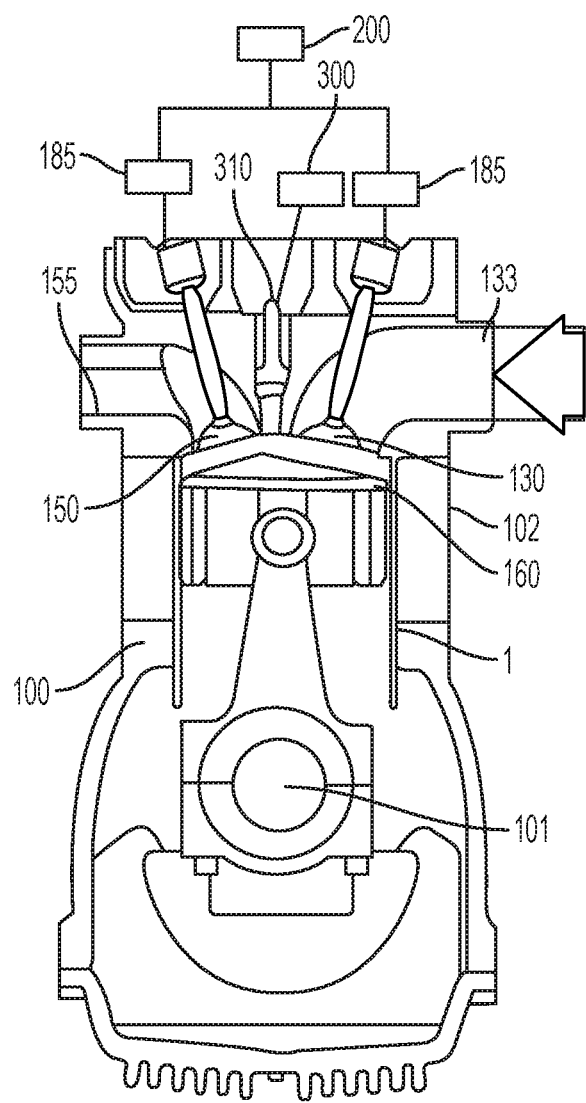
FIGS. 4A & 4B illustrate a cylinder with a reciprocating piston.

The engine 100 can be cam or camless, or a hybrid "cam-camless VVA." So, the intake and exhaust valves 130, 150 can either couple to a cam system for actuation, such as the camshafts 181, 182 example of FIG. 4A, a hydraulic rail, a latched rocker arm, other rocker arm, switching roller finger follower, lashed capsule, an electric actuator, a hydraulic actuator, or electro-hydraulic actuator, etc. For example, OEMs want engine braking at the same time that they want hydraulic lash adjustment. Few concepts can do both. It is possible to use a rocker arm lost motion capsule with reset to modularly perform HLA and braking. Other designs can include HLA and engine brake in a cam or camless engine.

As an alternative to that depicted, a camless direct acting mechanism can selectively operate the individual valves to open and close the cylinders.

Figure 4B:
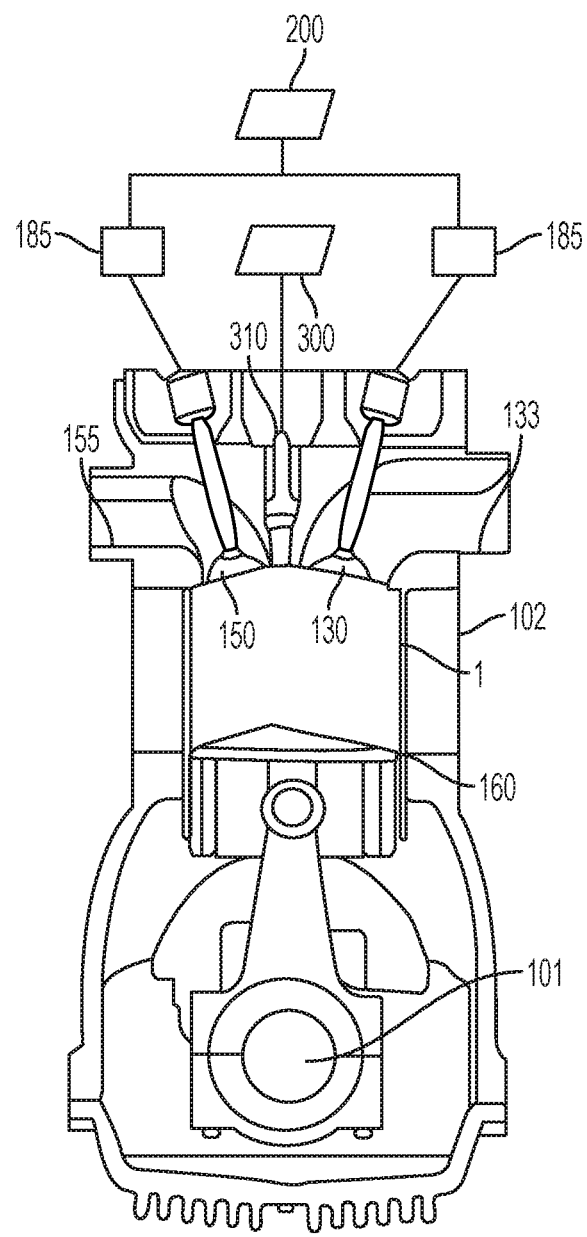

The crankshaft 101 can be coupled to transfer energy between the crankshaft 101 and the camshafts 181, 182 as by a torque transfer mechanism, which can comprise gear sets, belts, or other transfer mechanisms. While FIGS. 4A &4B show one intake valve 130 and one exhaust valve 150, it is possible to have two intake valves 130 and two exhaust valves 150 per each cylinder. In-line, V, and other cylinder layouts are possible. And, the techniques disclosed herein apply to diesel and gasoline engines.

A diesel engine works by compressing intake fluid in a cylinder 1-6 using a piston 160. Once the intake fluid has moved from the intake port 133 to within the cylinder, it can be referred to as a "charge," and when the charge moves from the cylinder to the exhaust port 155, it can be referred to as exhaust. A "charge" can be called "hot" or "cold." A cold charge is trapped in a deactivated cylinder when naturally aspirated or boosted air is held in the cylinder by deactivated intake valves and deactivated exhaust valves. A hot charge is trapped in a deactivated cylinder when fuel has been injected, so that combustion occurs, but the exhaust valve and intake valve are not opened to release the combusted charge from the cylinder.

In a combustion mode, fuel is injected via fuel injector 310. The high heat and compression ignites the fuel, and combustion forces the piston from top dead center (TDC) shown in FIG. 4A to bottom dead center (BDC) shown in FIG. 4B and torque is thereby directed to the crankshaft 101 for output on an affiliated flywheel. More basically, a reciprocating piston assembly is affiliated with the engine so that each cylinder comprises a respective reciprocating piston. One reciprocation of a piston causes the piston to travel from one position to the other and back again. For example, from BDC to TDC back to BDC. Or, from TDC to BDC back to TDC.

Several stroke modes are possible, and will be outlined with respect to the figures. A stroke mode comprises the one or more firing sequences available from when an intake valve opens to when the exhaust valve opens. A firing sequence is an opportunity to fire, which is typically near TDC when both the intake and exhaust valves are closed. In the deactive modes, several opportunities to fire, or combust fuel, can be had with no combustion of fuel. A charge of intake fluid can be compressed or re-compressed. When intake air is trapped in the cylinder, the charge is a cold charge. Or, a hot charge can be created, as by combusting fuel with the intake and exhaust valves closed, and then holding the combusted fluid for compression or re-compression. The stroke modes can transition from cold charge trapping to hot charge trapping in order to provide forcing function frequency profile management.

The standard mode, or active operation mode, for the engine comprises that stroke mode that the engine ordinarily uses when not in a deactive mode. The active operation mode will be explained with respect to a diesel engine, though gasoline engines can also benefit from the techniques disclosed herein.

Diesel operation can comprise stroke modes such as 2-stroke, 4-stroke, 6-stroke, and 8-stroke modes, and the active operation modes can comprise those stroke modes already known in the art. In standard mode 4-stroke mode, the piston moves from TDC (FIG. 4A) to BDC (FIG. 4B) to fill the cylinder with intake fluid (stroke 1). The intake valve opens and closes during this first stroke and the cylinder is full of intake fluid. The piston rises back to TDC (stroke 2). Fuel is injected at or near TDC and ignites to push the piston 160 to BDC (stroke 3). The piston rises again (stroke 4) to TDC to expel the exhaust out the exhaust valve, and the exhaust valve opens and closes to facilitate this. Exhaust gases leave cylinders through exhaust ports 155 in engine block 102. The intake valve 130 is open during stroke 1 and closed during strokes 2-4, though the VVA controller 200 can adjust the timing of opening and closing. The exhaust valve 150 is open during stroke 4 and closed during strokes 1-3, though the VVA controller 200 can adjust the timing of opening and closing. Compression occurs on the second stroke, and combustion occurs on the third stroke. 6-stroke and 8-stroke techniques include additional aspects of compression and injection after the intake valve has closed and prior to the exhaust valve opening. The application will discuss 4-stroke combustion techniques for the active operation modes in detail, but where compatible, the 4-stroke combustion techniques can be substituted with art-recognized 2-stroke, 6-stroke, or 8-stroke combustion techniques.

Figure 2:
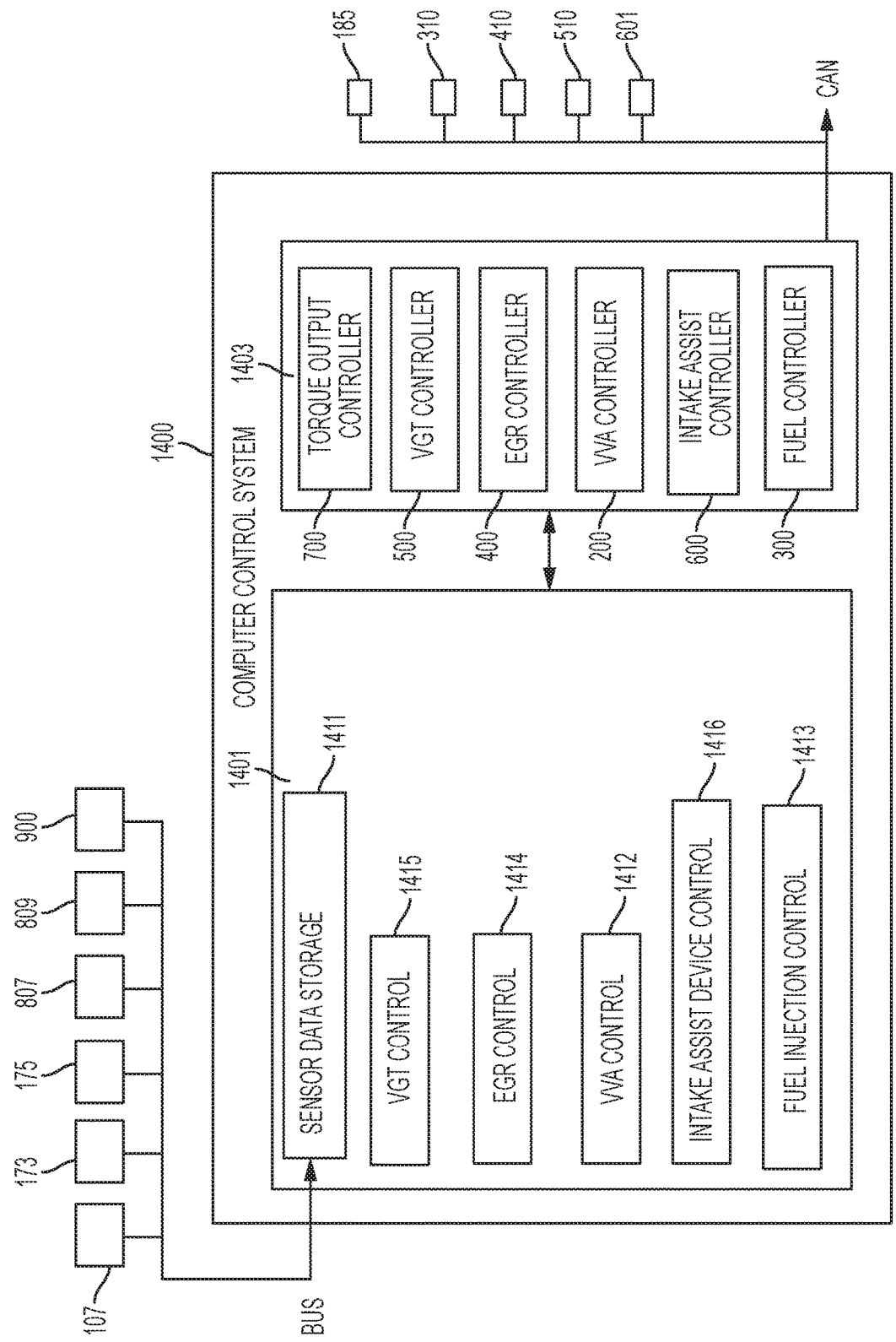
FIG. 2 is a schematic of a computer controller in a controlled system.

A computer control network is outlined in FIG. 2, and is connected to fuel injector 310 of fuel injection system and valve actuators 185 for respective intake valves and respective exhaust valves. When included, the computer control system is connected to an intake assist device 601 and such other items as an EGR valve 410 or a variable geometry turbine 510. When the engine is a gasoline engine, the computer control system 200 connects to spark plug controllers to ignite fuel for combustion.

The network can comprise a BUS for collecting data from various sensors, such as a crankshaft sensor 107, intake manifold sensor 173, exhaust manifold sensor 175, exhaust sensor 807, catalyst sensor 809, user input sensor 900, etc. The sensors can be used for making real-time adjustments to the fuel injection timing and quantity and valve opening and closing timing. Additional functionality can be pre-programmed and stored on the memory device 1401. The additional functionality can comprise pre-programmed thresholds, tables, and other comparison and calculation structures for determining power settings for outputting the required torque output for the cylinders of the operating engine, durations for the power settings and number and distribution cylinders at particular power settings. For example, a sensed vehicle start up selection, accessory selection, gear selection, load selection or other sensor feedback can provide indicia for determining a reciprocation speed of a reciprocating piston assembly coupled to the cylinders and the required torque output for the operating engine. The required torque output for the operating engine can be calculated in real time via the computer controller 1400, or it is possible to apply preconfigured load thresholds.

Algorithms for VVA control 1412 can comprise aspects for timing the stroke modes for each of the cylinders 1-6. By timing the stroke modes, it is possible to manage forcing function frequency profiles during operation of the engine. When the algorithms for VVA control 1412 are executed by VVA controller 200 in processor 1403 to implement a CDA (deactive operation) mode, the cylinder forcing function frequency profiles can be distributed to mimic a baseline of primary forcing function frequency profiles. For example, it is possible to perform a charge intake operation on a second cylinder prior to a deactive operation the intake valve and exhaust valve on the second cylinder. Meanwhile, in a first cylinder, it is possible to inject fuel during a deactive operation of a first cylinder in a first stroke mode to increase a pressure pulse or cylinder torque output or cylinder forcing function frequency profile of the first cylinder. The VVA controller 200 can implement a timing for the fuel injection so that the increased pressure pulse or cylinder torque output or cylinder forcing function frequency profile of the first cylinder of the first cylinder coincides with the performing of the charge intake operation on the second cylinder. The timing implementation facilitates the replication of active operation mode primary forcing function frequency profiles so that cylinders can operate in a deactive mode, and thus increase brake thermal efficiency for the engine, yet the standard NVH package can remain on the vehicle. The prevents CDA-specific NVH-cancelling device outlay while avoiding destructing mechanical resonance. Additional illustrative timing strategies are outlined below.

Memory device 1401 is a tangible readable memory structure, such as RAM, EPROM, mass storage device, removable media drive, DRAM, hard disk drive, etc. Signals per se are excluded. The algorithms necessary for carrying out the methods disclosed herein are stored in the memory device 1401 for execution by the processor 1403. When optional variable geometry turbocharger control is implemented, the VGT control 1415 is transferred from the memory 1401 to the processor for execution, and the computer control system functions as a turbocharger controller. Likewise, the computer control system 1400 implements stored algorithms for EGR control 1414 to implement an EGR controller 400; implements stored algorithms for intake assist device control 1416 to implement intake assist controller 600; and implements stored algorithms for fuel injection control 1413 to implement fuel injection controller 300. When implementing stored algorithms for VVA control 1412, various intake valve controller and exhaust valve controller strategies are possible relating to valve timing and valve lift strategies, as detailed elsewhere in this application, and these strategies can be implemented by VVA controller 200. A controller area network (CAN) can be connected to appropriate actuation mechanisms to implement the commands of the processor 1403 and various controllers.

While the computer control system 1400 is illustrated as a centralized component with a single processor, the computer control system 1400 can be distributed to have multiple processors, or allocation programming to compartmentalize the processor 1403. Or, a distributed computer network can place a computer structure near one or more of the controlled structures. One controller can influence the operation of another controller. For example VVA controller 200 can influence or dictate the output of fuel controller 300. VVA controller 200 could dictate the timing of fuel injection by fuel controller 300 while the fuel controller 300 controls the quantity of fuel so injected, for example. As another alternative, a distributed computer network can communicate with a centralized computer control system or can network between distributed computer structures. Subroutines can be stored at the structures of the distributed computer network, with centralized or core processing conducted at computer control system 1400.

The computer network comprises the processor 1403, at least one tangible memory device 1401, and processor-executable control algorithms for implementing the methods disclosed herein stored in the memory device 1401 and executable by the processor 1403. The stored processor-executable control algorithms implement the disclosed methods.

Returning to the issue of balancing engines operating in cylinder deactivation mode, and returning to the Figures, we continue to study how fuel and air charge ignite and produce a pressure in an engine cylinder which produces a transient torque at the engine flywheel. An engine is designed such that multi-cylinder engines time these forces equally throughout the engine combustion cycle so that the dynamic forces reflected at the engine flywheel are balanced in such a way to minimize the engine vibration and the torsionals that are transmitted into the vehicle driveline. FIG. 1A, presents the combustion pressures seen in each cylinder of the 6 cylinder engine overlaid upon one another in the appropriate 6-cylinder firing order.

The crankshaft angle in degrees is contrasted against the cylinder pressure in Atmospheres for a 6-cylinder engine in a 4-stroke active mode. The cylinders can output 100%, or max, cylinder torque output. A simplified sum of the torque outputs for the 6 cylinders is shown in FIG. 1B with phasing to make the three dimensional nature of the torque output convenient to illustrate. The simplified sum of the torque outputs shows an aggregate torque output in Newton meters (Nm). This is the torque signal that would be transmitted into the driveline of an affiliated vehicle. Each cylinder contributes additively to an aggregate torque output, and the aggregate torque output can change as the fueling, crankshaft RPMs, valve timing, charge air boost, among others, are changed for the cylinders.

The forcing function frequency profile for the aggregate torque output for an engine cycle comprising two crankshaft revolutions at 800 rotations per minute is shown in FIG. 1C. Being an active operation mode, FIG. 1C is a baseline of primary forcing function frequency profiles. The frequency content of this signal is very clean. The first order forcing function frequency profile supplies torque frequency content at 40 Hz with a torque frequency amplitude above 450 Nm. A second order forcing function frequency profile supplies torque frequency content around 80 Hz at a torque frequency amplitude of about 225 Nm. A third order forcing function frequency profile supplies torque frequency content at about 120 Hz at a torque frequency amplitude of about 60 Nm. This baseline is undamped.

When cylinder deactivation is implemented, the cylinder forcing function frequency profiles are adjusted, and this can introduce undesired driveline dynamic forces. In addition, the forcing function frequency drops and in some cases it begins to excite driveline components such that, if operated at these points continuously, destruction of those components is inevitable. So, a strategy to eliminate these destructive CDA modes has been devised.

The current cylinder deactivation process brings in a fresh cool charge of air from the engine's intake system into the expanding engine cylinder via intake port 133. After the fresh charge is ingested both the intake and exhaust valves 130, 150 are deactivated to trap the air in the cylinder. As the cylinder piston 160 continues to rotate, it takes the energy out of the crankshaft 101 and compresses the air charge, pressurizing it until TDC is reached (FIG. 4A). After TDC, the pressurized air forces the piston 160 back down to BDC (FIG. 4B), returning the pressurized air energy back into the crankshaft 101. This process continues until cylinder deactivation mode is turned off and the exhaust valve 150 becomes operational again.

This compressing and uncompressing of the air produces pressure dynamics that are transmitted to the crankshaft and in turn produces torque variations at the flywheel. The principles are not much different than what occurs in a firing cylinder, but the impact on the aggregate torque output and on the aggregate forcing function frequency profile can be there is less torque and more NVH to manage. With appropriate selection and timing, there can be less torque, but a lesser or similar amount of NVH to manage. For example, the pressures seen in the deactivated cylinder can be about 20% that of the firing cylinder. This variation between pressure pulses for firing and non-firing cylinders causes differences in the forcing function frequency seen on a crankshaft which introduces unwanted driveline vibrations. This can be seen in FIG. 5A, where cylinders 4-6 are deactivated in CDA mode while cylinders 1-3 follow the 4-stroke firing sequence of FIG. 1A. The 3 deactivated cylinders have the pressure compressing and expanding at relatively low pressure every 2 strokes of the engine while the active operation mode cylinders have higher pressure every 2 strokes of the engine. Such an arrangement cuts the max torque output in half and can be used for outputting 50% of the theoretically possible power.

Figure 5A:
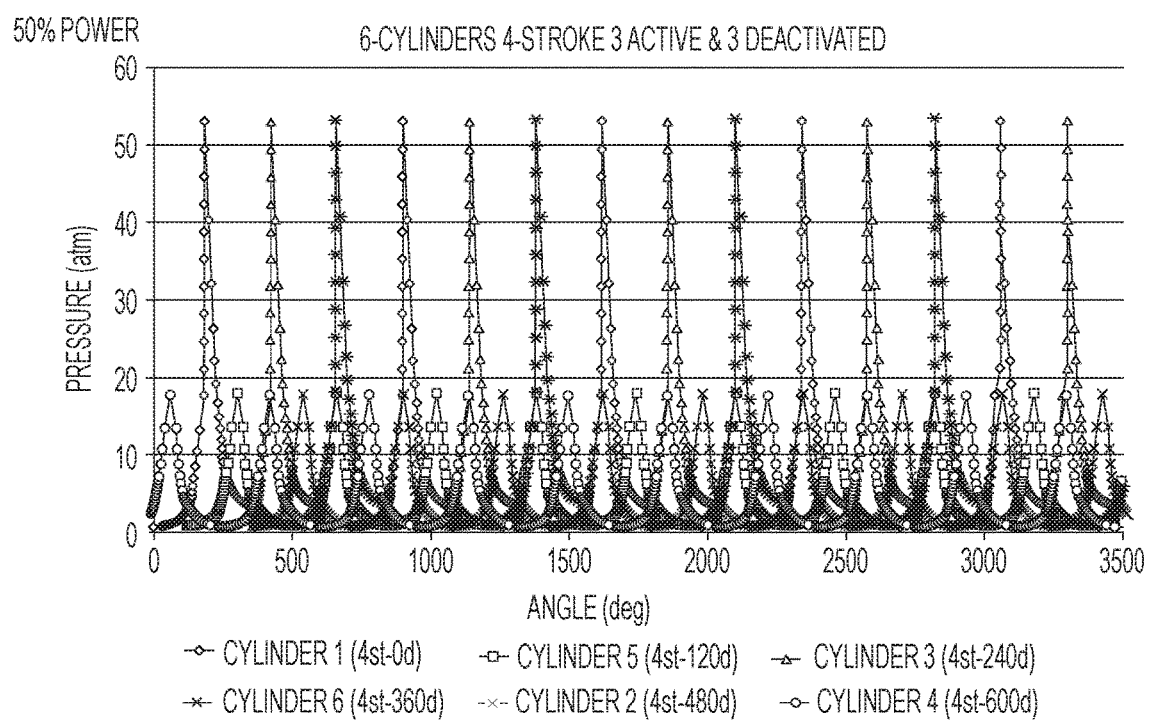
FIGS. 5A-5D illustrate examples of CDA modes that fail to have forcing function frequency profiles that match baseline forcing function frequency profiles.
Figure 5B:
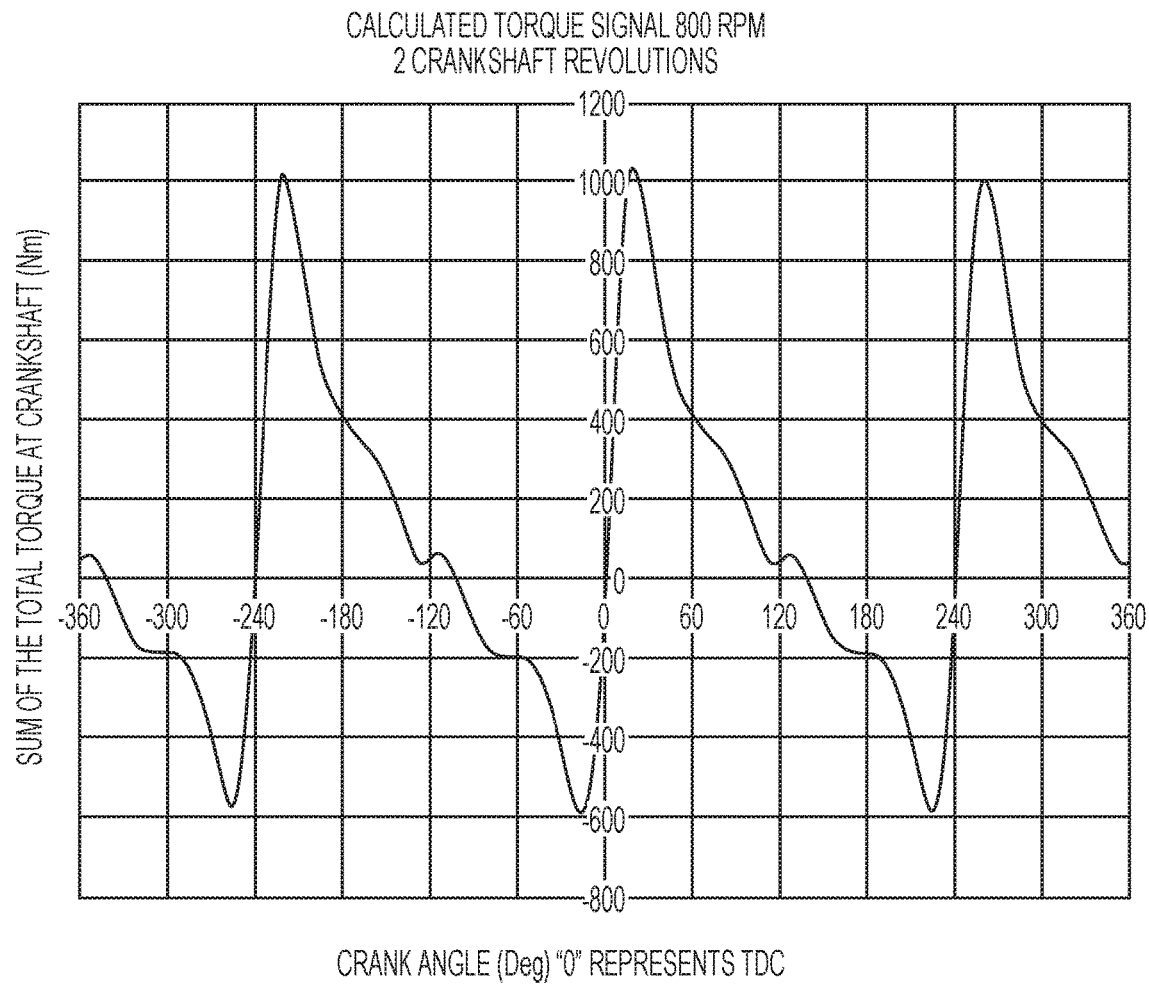

FIG. 5B sums the total torque at the crankshaft in Newton meters. The pressure and inertia profiles for each of the 6 cylinders are appropriately phased and reflected to the crankshaft. This is the torque signal that would be transmitted into the driveline of the vehicle. The total torque is shown with respect to the crank angle of the crankshaft.

Figure 5C:
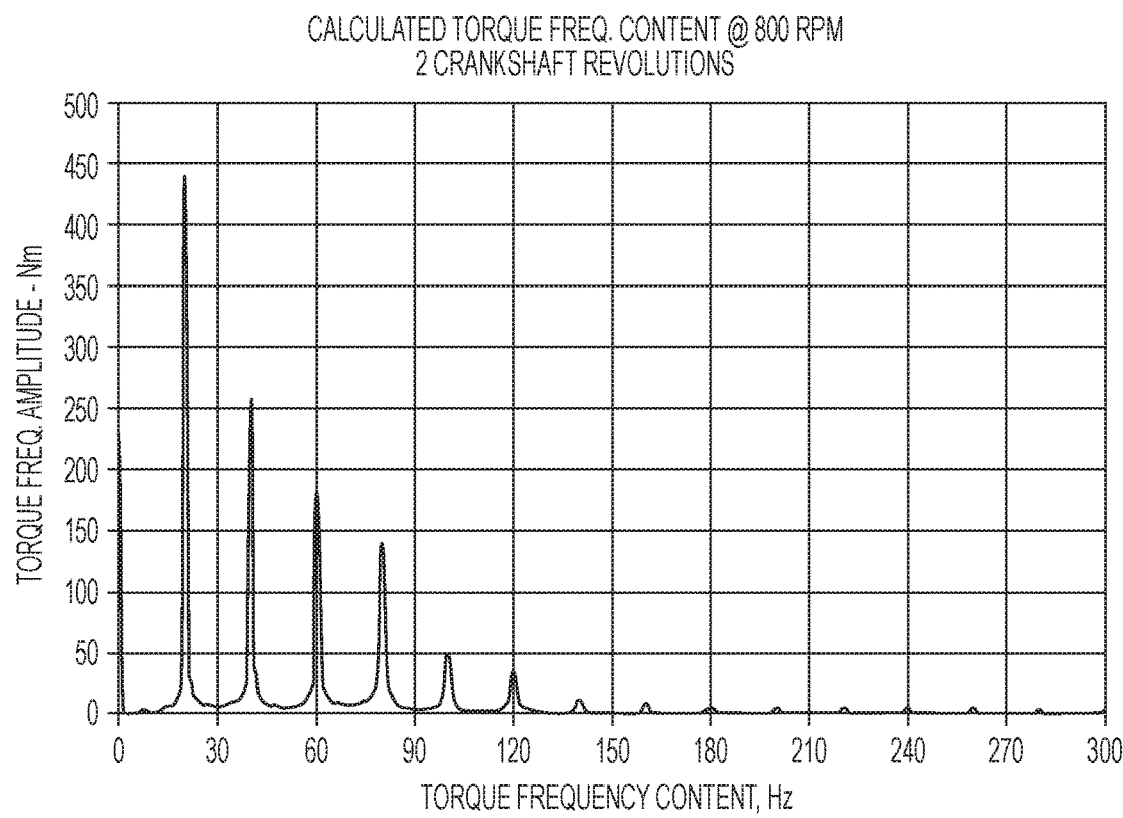

The frequency content of the torque transients of an engine where 3 cylinders are firing with 3 cylinders deactivated on a cold charge is shown in the aggregate of forcing function frequency profiles of FIG. 5C. The engine flywheel frequency content for the 6-cylinder engine shows much more noise than FIG. 1C. The first, second, and third order primary forcing function frequency profiles do not align with those of FIG. 1C. A fourth and a sixth order profile are near in frequency to the second order and third order primary forcing function frequency profiles of FIG. 1C, but the primary forcing function frequency profiles of FIG. 5C have dropped. The first order has dropped by 50% to 20 Hz, and also has an amplitude near 450 Nm. This cold charge strategy has high torque frequency amplitudes at low Hertz values. This CDA operation mode is an example of one that would be excluded under the principles of this disclosure absent an engine or driveline accommodation that can damp the primary forcing function frequency profiles.

Figure 5D:
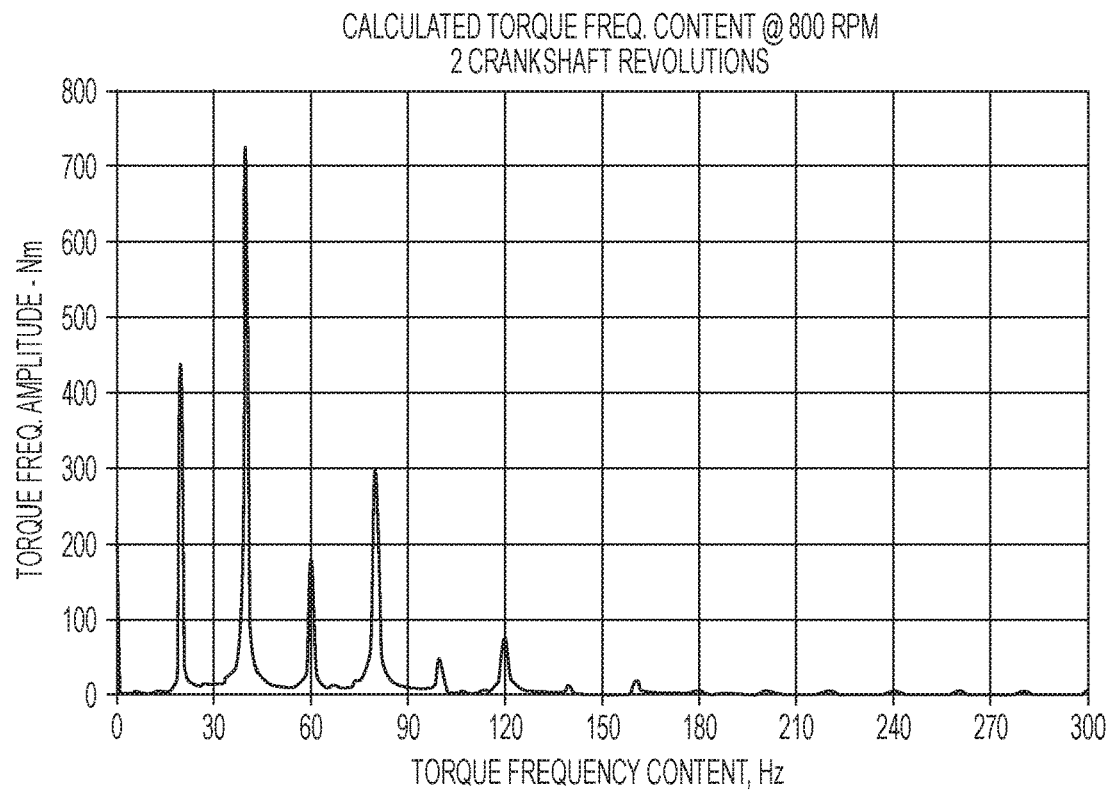

If the strategy of FIGS. 5A-5C used a hot charge instead of the recompression of a cold charge and was able to sustain the hot charge, the primary frequency can be moved back up to 40 Hz, as shown in FIG. 5D. But, now the first order primary forcing function frequency profile it has a much greater amplitude of 700 Nm. The second order primary forcing function frequency profile frequency is similar to the cold charge first order primary forcing function frequency profile at 20 Hz and also has about a 450 Nm torque amplitude. One can see that nothing is gained, from a mechanical resonance perspective, from this strategy. In fact it is much worse than FIG. 5C and is another example of a CDA operation mode that would be excluded under the principles of this disclosure.

Trying to increase or decrease the number of cylinders using a CDA operation mode, from 3 cylinders to 2 or 4 cylinders, introduces additional, lower Hertz, frequencies in to the aggregate of forcing function frequency profiles. Though, it is possible to come down from the high amplitudes of primary forcing function frequency profiles of the 3 cylinder CDA operation mode. However, these lower Hertz frequencies introduce unwanted excitations that can potentially fail driveline components when not addressed by additional hardware on the driveline.

So, it is possible to introduce new multi-stroke strategies to reduce or eliminate the lower unwanted frequencies in the aggregate of forcing function frequency profiles. The multi-stroke strategies can comprise deactive operation where hot charge trapping is performed as by injecting fuel while keeping the intake and exhaust valves closed.

To reduce the variation between pressure pulses for active operation mode cylinders and deactivated (CDA) mode cylinder, the CDA mode can be modified to a deactive mode. Then, the pressures found in the active operation mode cylinders and deactive mode cylinders are much closer together. This can be accomplished by trapping a combustion charge for an extra 1-4 cycles after a combustion charge is ignited.

One example of this strategy would be to use a deactive mode on half of the cylinders and keep the other half of the cylinders firing in active operation mode. For the firing cylinders there is a slight modification to the standard 4 stroke cycle. When the cylinder is ignited it will expand in the normal way, but when it reaches BDC, instead of opening the exhaust valve, the intake and exhaust valves 130, 150 are deactivated and the pressurized gases are held in the cylinder for 4 more piston strokes. This will cause the piston to work against the expanded gas to re-compress the hot gases again. As the piston compresses the gas, energy will be taken out of the crankshaft until TDC is reached. After TDC, the hot pressurized gas forces the piston back down, returning the pressurized gas energy back into the crankshaft. This process continues until deactive mode is turned off for that cylinder. After the additional 4 piston strokes, the exhaust valve becomes operational again.

Figure 6:
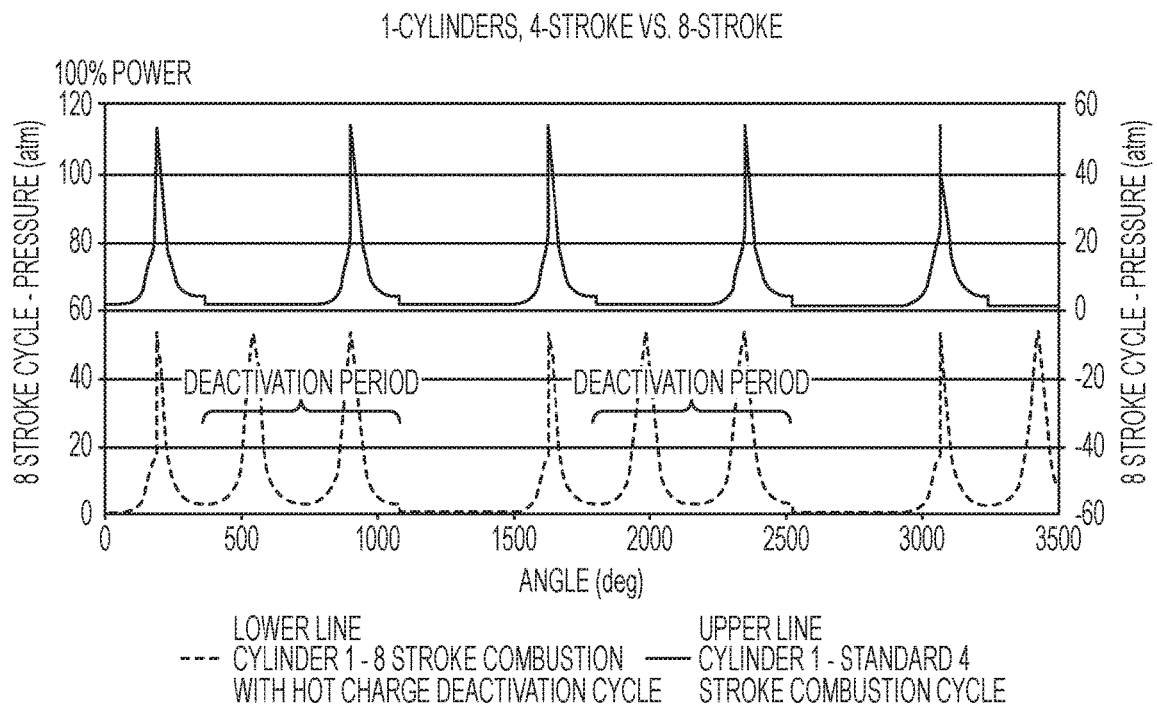
FIG. 6 illustrates an 8-stroke deactive mode for a 6-cylinder engine.

This can be seen in FIG. 6. The upper line is for comparison and shows a standard 4-stroke mode pressure pulse as the crankshaft rotates, which is similar to shown for a cylinder in FIG. 1A. The lower line shows the modifications to form the deactive mode. A horizontal bar delineates the deactivation period after combustion occurs on the preceding pressure pulse. This strategy could be considered an 8-stroke mode, but traditional 8-stroke cycles have other operation occurring during the additional strokes. In this case there is not any additional operation occurring in these added strokes. The added strokes are only there to provide better NVH in support of cylinder deactivation modes.

Figure 7:
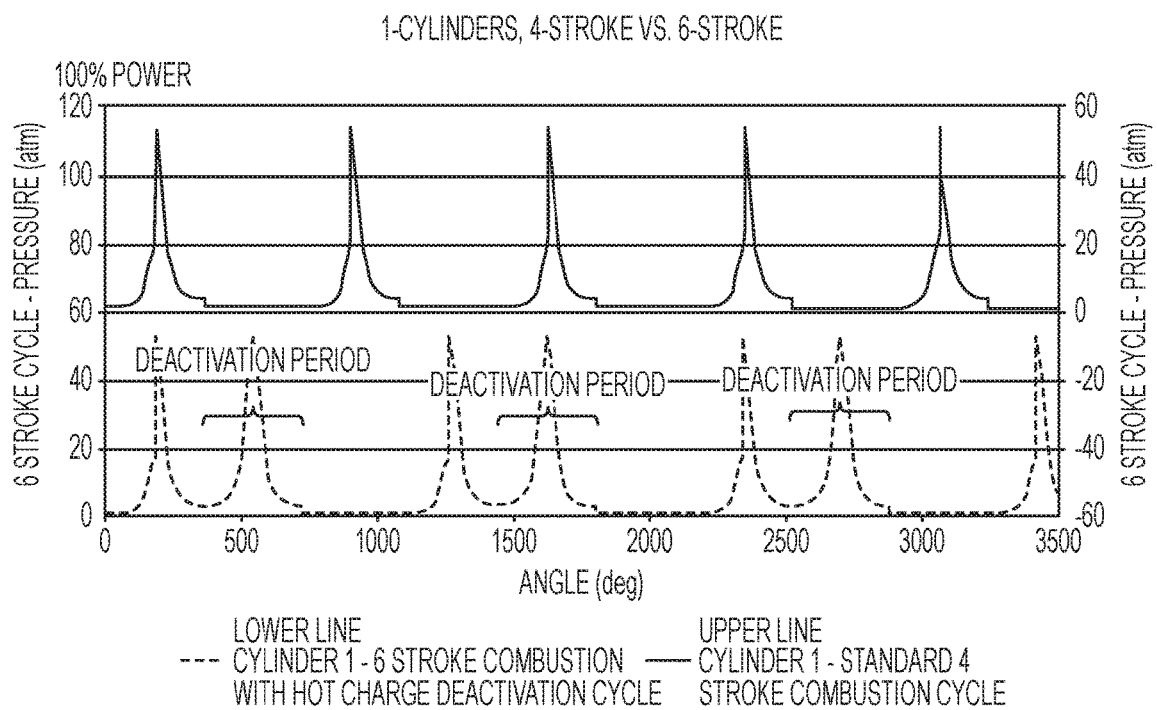
FIG. 7 illustrates a 6-stroke deactive mode.

FIG. 7 shows a similar strategy to FIG. 6, but the exhaust valve remains closed for only 2 extra piston strokes instead of the 4 additional strokes of FIG. 6. This strategy could be considered a 6-stroke mode. One drawback to these strategies is that the power (torque output) will be less than that of the traditional 4-stroke operation since 50% of the cylinders are deactivated for a portion of the deactive mode. For example, the lower line of FIG. 7 can have a 33% power output.

FIGS. 6 & 7 related to dynamically deactivating cylinders in order to produce a multi-stroke strategy where the ignition of the fuel occurred after the first compression stroke. In the next Figures, the multi-stroke strategy is modified to allow for cold charge compressions prior to the ignition of the fuel, then followed by hot charge compression of the gas within the cylinder and finally the exhausting of the gas from the cylinder.

In this next set of cases, instead of deactivating a certain number of cylinders to reduce airflow through the engine and increase temperature, the cold and hot charge deactive multi-stroke strategy would be set up to operate, as one example, on all 6 cylinders in a consistent repetitive manner in order to approximate or replicate a baseline of primary forcing function frequency profiles, which is the vibration signature, of a traditional 6 cylinder. The deactive mode control strategy would operate all 6 cylinders in the same way. An 8-stroke cycle would repeat its cycle every 1440 degrees of crank rotation. A 12-stroke cycle would repeat its cycle every 2160 degrees of crank rotation. A 16-stroke cycle would repeat its cycle every 2880 degrees of crank rotation and so on.

Figure 8:
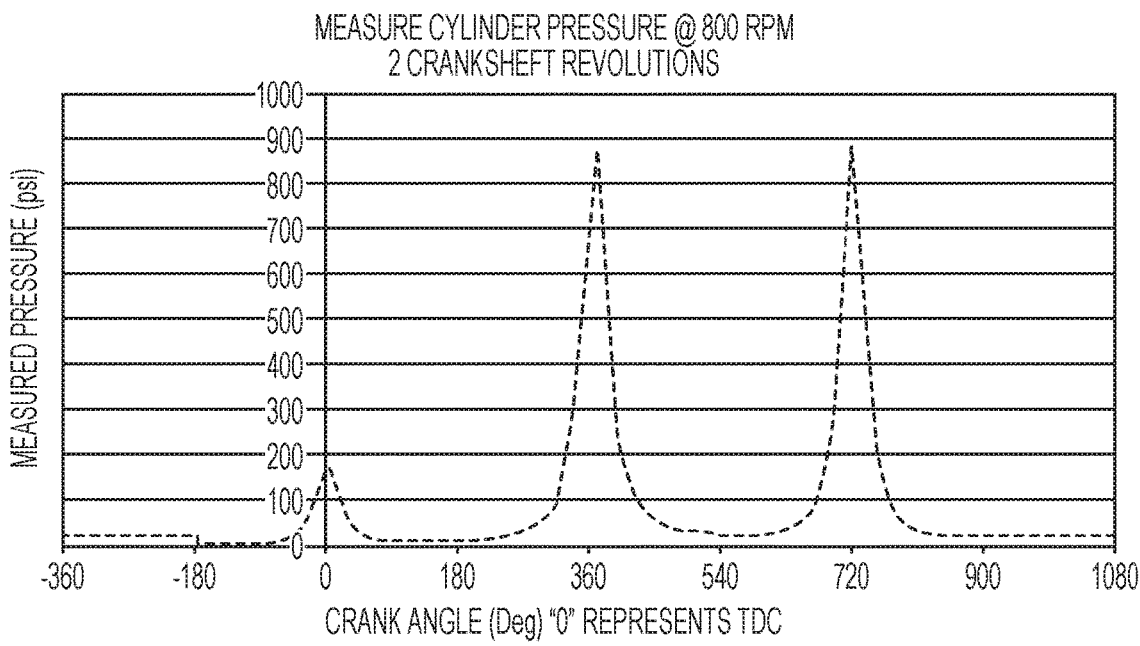
FIG. 8 illustrates a hybrid deactive stroke mode comprising cold and hot charge capture in the firing sequence.

The first multi-stroke deactive mode strategy with a transition from cold charge capture to hot charge capture investigated is the 8 stroke strategy in FIG. 8. Here the first stroke is the intake stroke, followed by a cold charge compression and expansion. The next 2 strokes are the compression and ignition-combustion strokes followed by hot charge compression and expansion strokes and finally the exhaust stroke. In this case, the traditional 4-stroke cycle for the given cylinder has to be deactivated for at least one exhaust and intake cycle in order to obtain the 8-stroke cycle strategy.

Figure 9A:
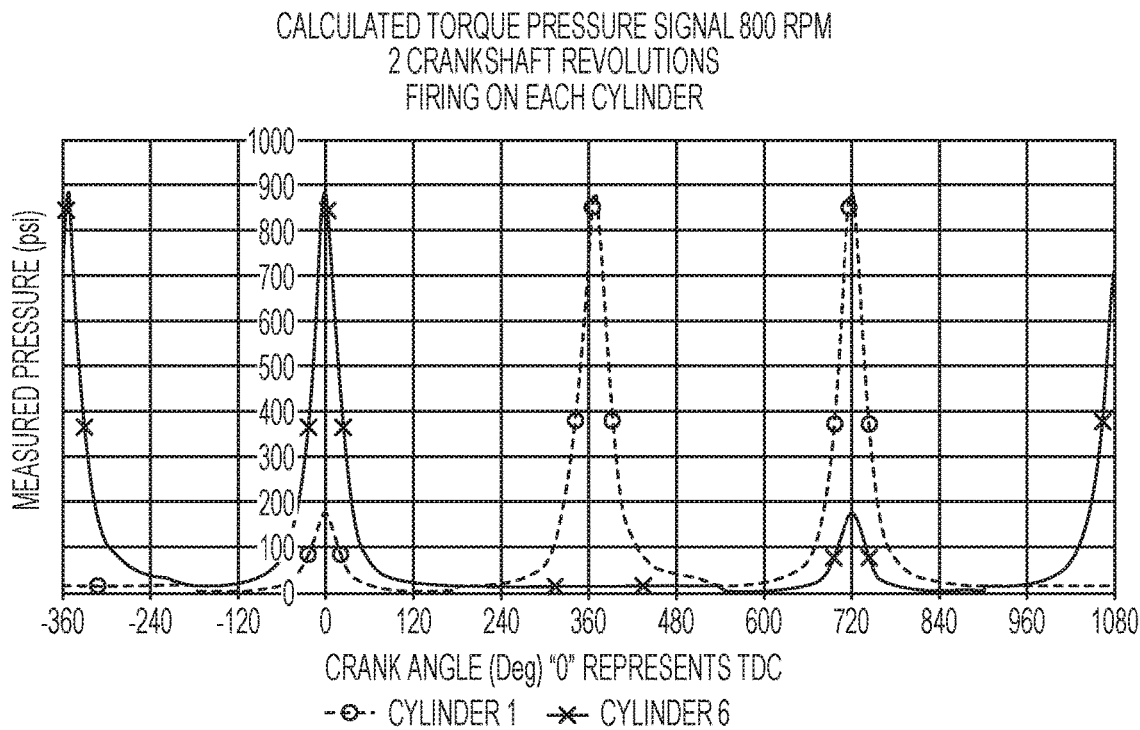
FIGS. 9A-9C apply the hybrid deactive stroke mode to illustrate how to have a forcing function frequency profile that approximates baselines of primary forcing function frequency profiles.

To balance the cylinders out, at least two pair of cylinders are operated in the same manner and the timing is adjusted to phase them by 720 degrees, as suggested in FIG. 9A. For the 8-stroke case, in addition to having a deactivation VVA system, one also will need a VVA system that allows for valve actuation that is out of phase of a traditional 4-stroke cam system on at least half of the cylinders. Cam-camless or full camless could accomplish this task.

Figure 9B:
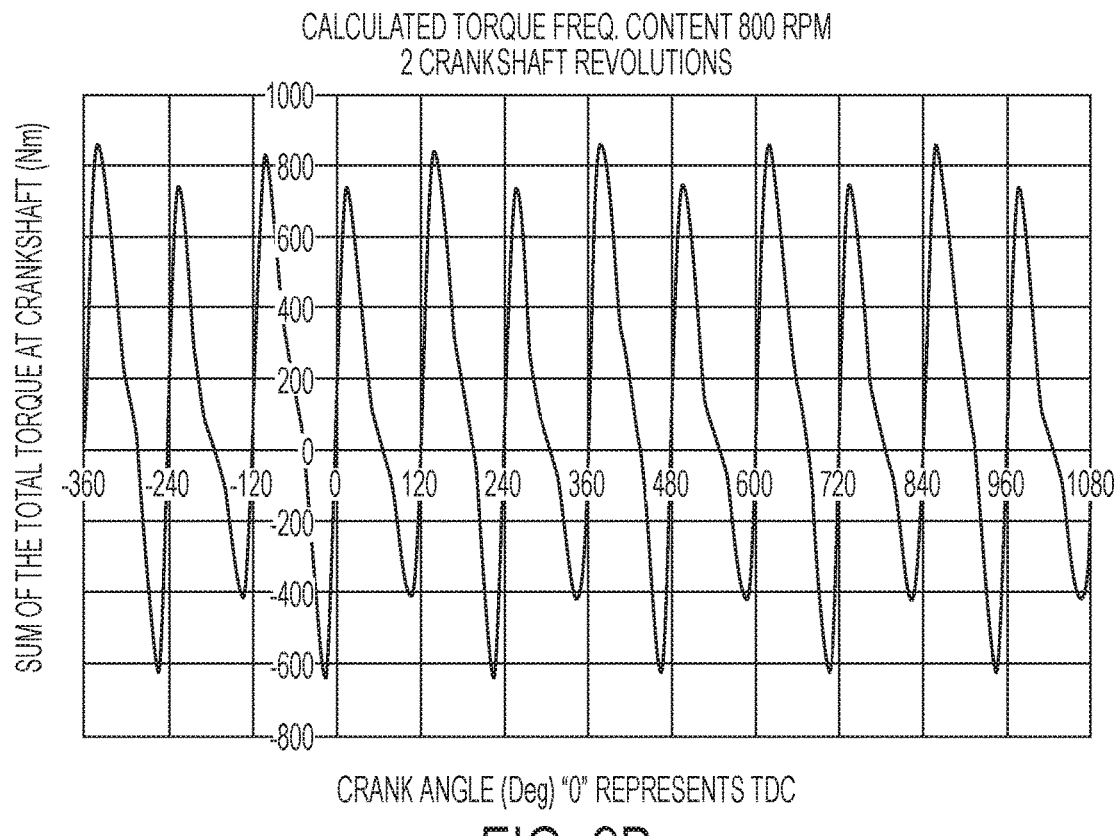
Figure 9C:
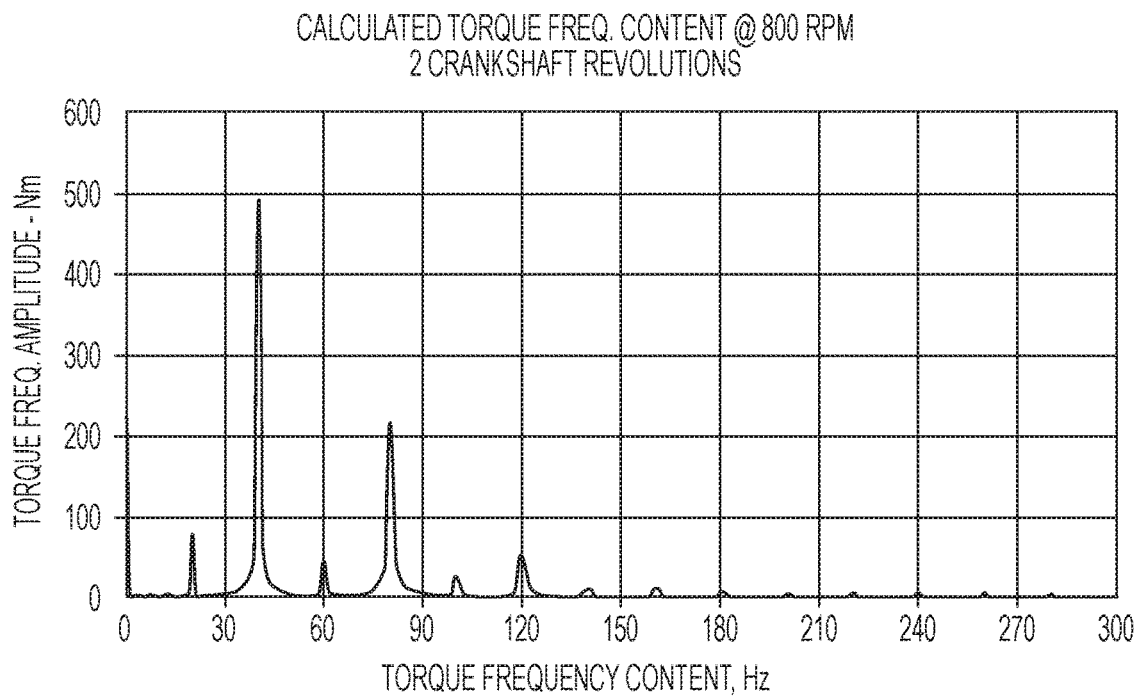

FIG. 9B shows the aggregate torque output as the sum of the total torque at the crankshaft in Newton meters for the 6 cylinders firing according to the 8-stroke deactive mode of FIG. 9A. Phasing is provided to make the representation convenient to view. The sum of the cylinder forcing function frequency profiles is shown in FIG. 9C. The primary forcing function frequency profiles approximate the torque frequency content of the baseline of primary forcing function frequency profiles shown above in FIG. 1C. And, the torque frequency amplitudes of the primary forcing function frequency profiles of the 8-stroke deactive mode cylinders is also approximate to that shown in FIG. 1C. The amplitude of the first order primary forcing function frequency profile of the 8-stroke deactive mode is slightly higher than the baseline first order primary forcing function frequency profile, but the difference is not statistically significant nor sufficiently large to require a new driveline component or technique for combatting mechanical resonance. In addition, FIG. 9C shows the generation of minor amplitudes at additional frequencies. These additional profiles are of minor consequence, and can be reduced or eliminated by boosting the intake for the charge capture, or by adjusting the intake or exhaust valve timing, or both.

The repetitive, timed deactive modes can be extended to 12- and 16-stroke strategies. A 12-stroke deactive mode applies the same pattern on all cylinders and repeats every 2160 degrees. In addition to the 12-stroke deactive mode, there are also different options to timing when the cylinders are fired sequentially. For example, it is possible to apply a first firing sequence to a first set of cylinders that fires cylinders 1, 5 & 3 in the first 2 strokes. Then, the second set of cylinders (6, 2 & 4) are fired in the last 2 strokes of the first firing sequence's 12-strokes. This can be seen in FIG. 10 and is explained in more detail in Table 1.

TABLE 1

| Stroke | Degree | Intake | Exhaust | Action |
|---|---|---|---|---|
| 1st | 0-180 | Base-Circle | Base-Circle | Re-compression compression stroke which compresses the trapped air |
| 2nd | 180-360 | Base-Circle | Base-Circle | Standard ignition & power stroke which provides the power to drive the crankshaft |
| 3rd | 360-540 | Deactive | Deactive | re-compression stroke which compresses the trapped burned gases |
| 4th | 540-720 | Deactive | Deactive | re-expansion stroke which expands the previously compressed burned gases |
| 5th | 720-900 | Base-Circle | Base-Circle | re-compression stroke which compresses the trapped burned gases |

TABLE 1-continued

| Stroke | Degree | Intake | Exhaust | Action |
|---|---|---|---|---|
| 6th | 900-1080 | Base-Circle | Base-Circle | re-expansion stroke which expands the previously compressed burned gases |
| 7th | 1080-1260 | Active | Active | Standard exhaust stroke which exhaust the trapped burned gases through exhaust valves |
| 8th | 1260-1440 | Active | Active | Standard intake stroke which ingests a full charge of fresh air |
| 9th | 1440-1620 | Base-Circle | Base-Circle | Standard compression stroke which occurs after a full air intake charge |
| 10th | 1620-1800 | Base-Circle | Base-Circle | Expansion stroke with no fuel injection to provide power |
| 11th | 1800-1980 | Deactive | Deactive | Re-compression stroke which compresses the trapped air |
| 12th | 1980-2160 | Deactive | Deactive | Re-expansion stroke which expands the previously compressed air |

In Table 1, the twelve strokes for cylinder 1 of FIG. 10 are assigned an ordinal in the first column and correlated to the degree at which the crankshaft has rotated in the second column. The position of the cam lobes with respect to the intake and exhaust valves is also explained with respect to active, deactive or base circle status identifiers. Actions during the stroke are given in the final column. Note that in FIG. 10, cylinder 1 is shown at the zero crank angle position and is partway through the repetitive deactive mode. So, the 8th stroke of Table 1 would be a starting point if one were starting this 12-stroke mode at the intake stroke.

Figure 10A:
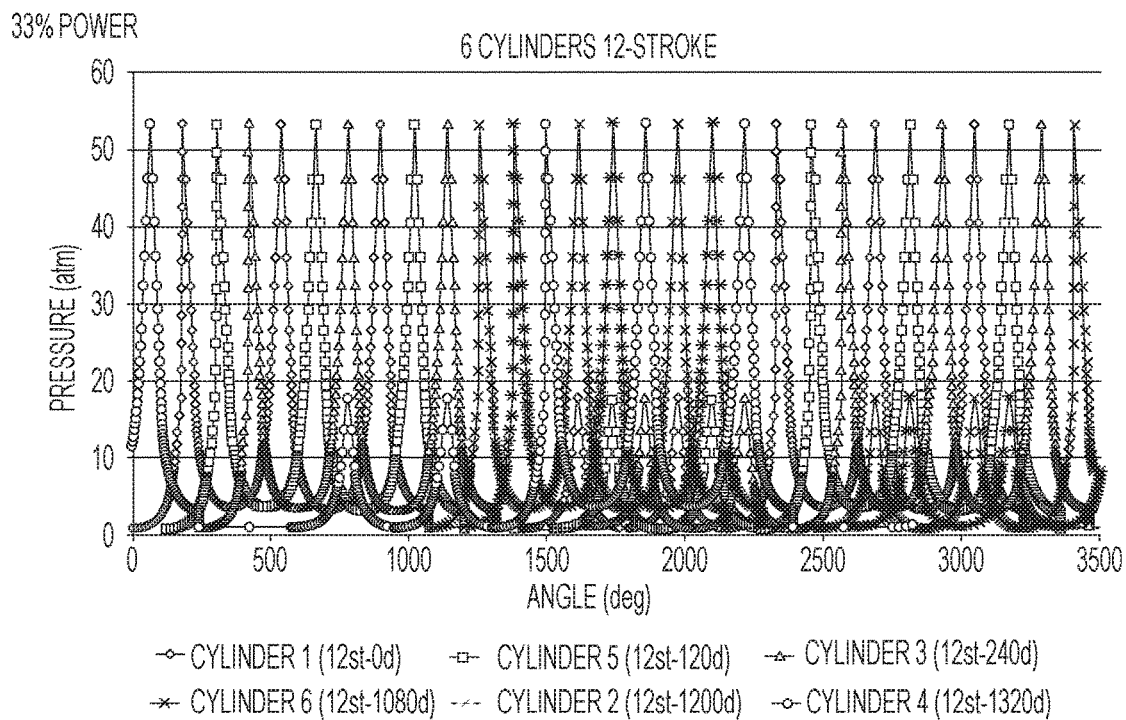
FIGS. 10A-10F illustrate 12-stroke modes that have forcing function frequency profiles that approximate baselines of primary forcing function frequency profiles.
Figure 10B:
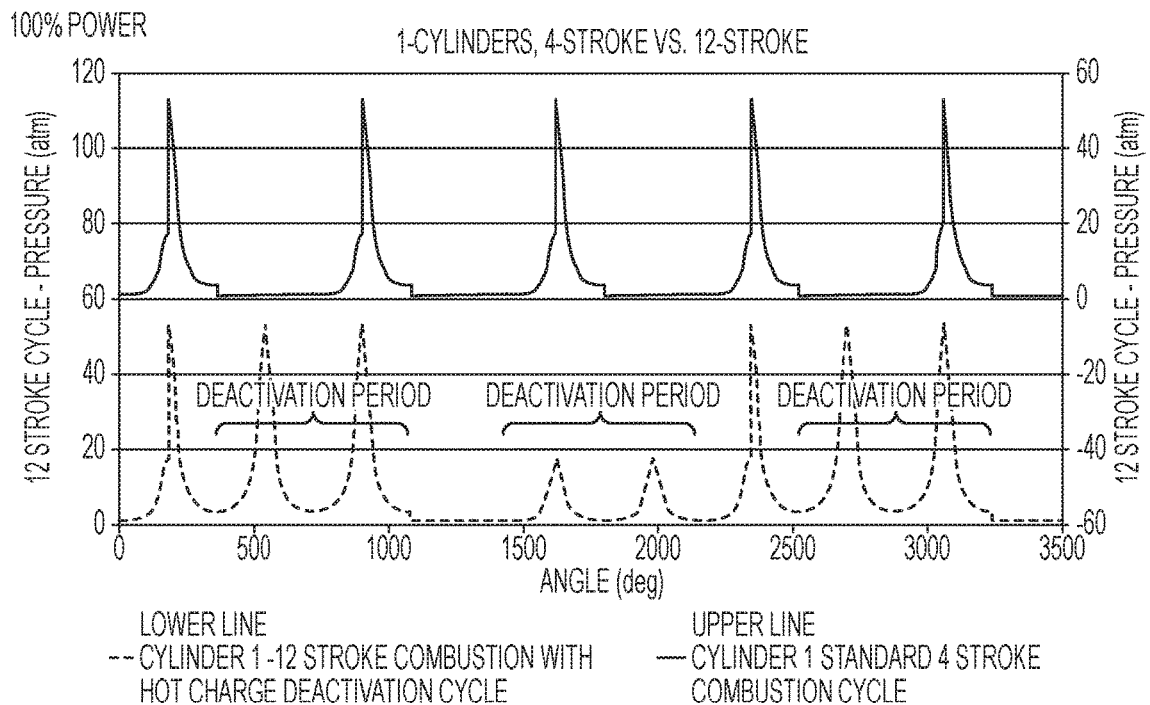

FIG. 10B serves to explain the difference between the standard active operation under a 4-stroke strategy in the upper line and the deactive 12-stroke strategy of FIG. 10A. The two deactivation periods within a 12-stroke cycle that resemble CDA mode are delineated by the horizontal bar. The fuel injection point can be seen between the cold charge deactivation period of lower pressure (in Atmospheres) and the higher pressure hot charge deactivation period.

In this 12-stroke mode there are the standard compression, power, exhaust, and intake strokes. In addition there are two compression and expansion strokes at combustion pressures (at strokes 3-6) and two compression and expansion strokes at intake pressures (at strokes 9-12). This strategy requires the intake and exhaust valves be deactivated and reactivated twice in the 12 crankshaft revolutions.

This 12-stroke mode strategy can replicate the plot of FIG. 1B, with the difference that there are 28 fuel injections and thus power strokes for FIGS. 1A-1C, whereas FIGS. 10A & 10B have only has 9 power strokes. This equates to a power output of about 33% for this 12-stroke strategy.

Figure 10C:
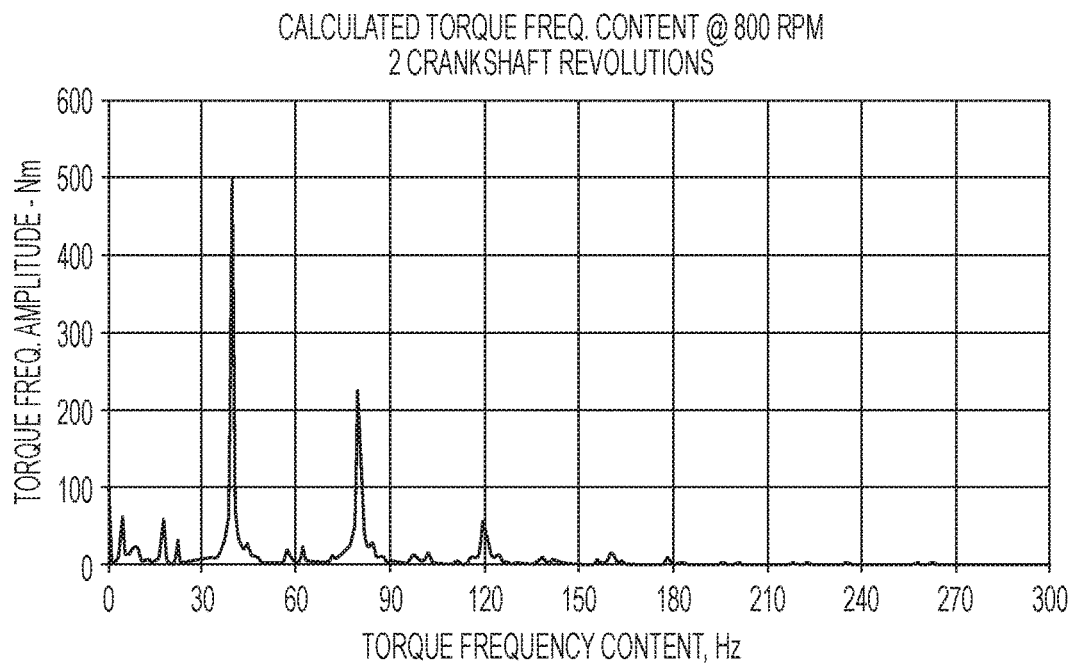

FIG. 10C shows that, much like FIG. 9C, the primary forcing function frequency profiles for the 12-stroke mode strategy approximate the FIG. 1C primary forcing function frequency profiles. And, like FIG. 9C, FIG. 10C shows the generation of minor amplitudes at additional frequencies. These additional profiles are of minor consequence, and can be reduced or eliminated by boosting the intake for the charge capture, or by adjusting the intake or exhaust valve timing, or both. In any case, the primary forcing function frequency profiles of the FIG. 10A strategy are sufficiently approximate to the baseline of primary forcing function frequency profiles shown above to be a successful operation mode for the principles of this disclosure.

Similarly compatible 12-stroke deactive operation mode can be devised. For example, an alternative 12-stroke strategy modifies the sequence and timing of firing the cylinders. Cylinders 1 & 6 are matched to fire together, cylinders 2 & 6 are matched to fire together and cylinders 3 & 4 are matched to fire together. Then, there are three sets of cylinders and three identical stroke modes that are timed to interleave one another.

Figure 10D:
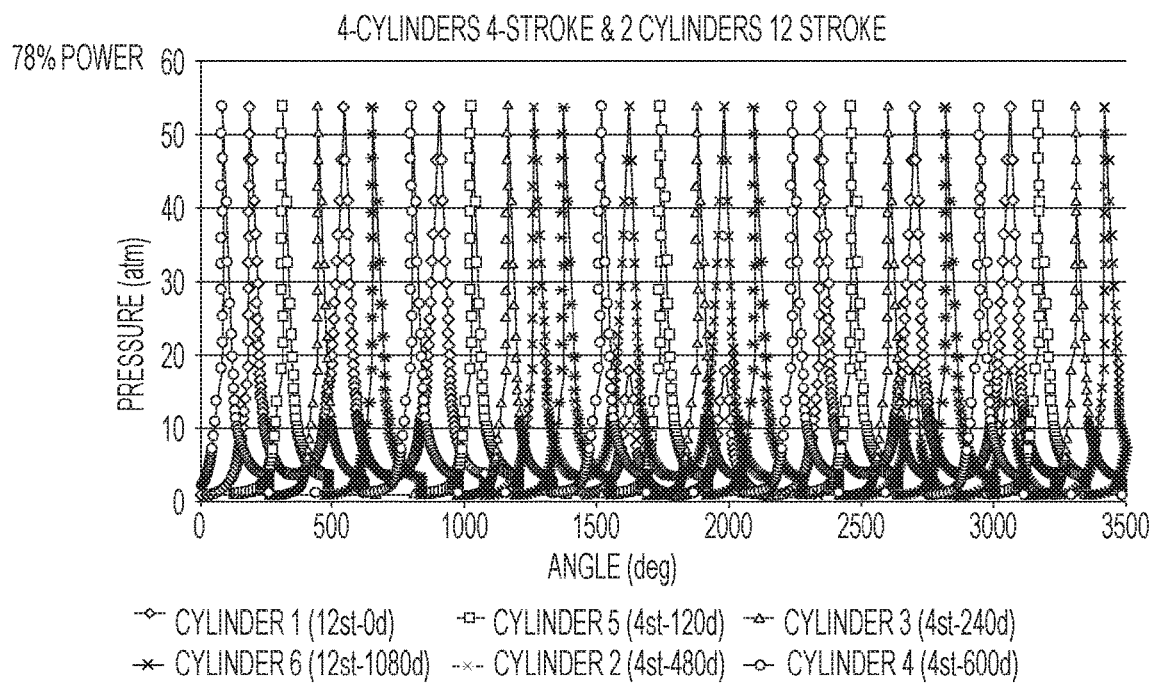
Figure 10E:
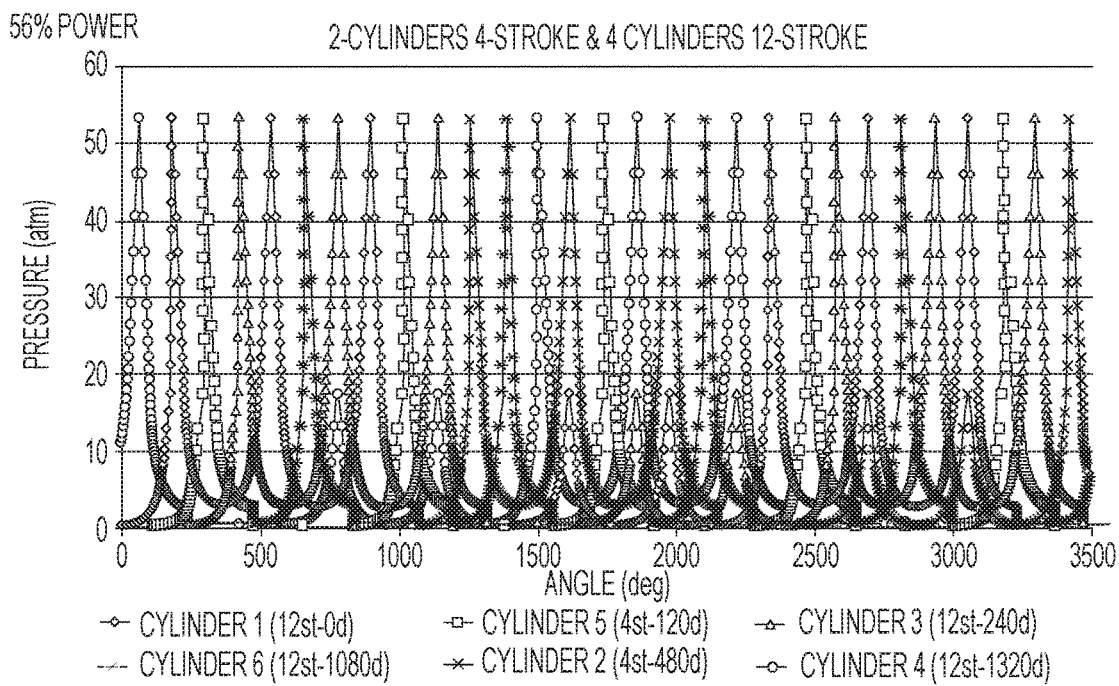

Additional 12-stroke deactive operation mode strategies can combine with 4-stroke active operation modes as shown in FIGS. 10D & 10E. An engine could run a combination of the 4-stroke cycle strategy with the 12-stroke cycle strategy. For example, FIG. 10D, where 4 cylinders are running the 4-stroke cycles and 2 cylinders are running the 12-stroke cycle the torque output of this strategy will be about 75% of the full 6-cylinder power case. This strategy keeps 4 of the 6 cylinders firing in their normal 4-stroke mode but the other 2 cylinders operate in the 12-stroke deactive mode. Note that 2 cylinders are out of phase by 1080 degrees. FIG. 10D shows the firing sequence for this strategy with 14 fuel injections and thus power strokes which equates to a power output of about 14/18=~75% for this strategy of a 6 cylinder engine.

Figure 10F:
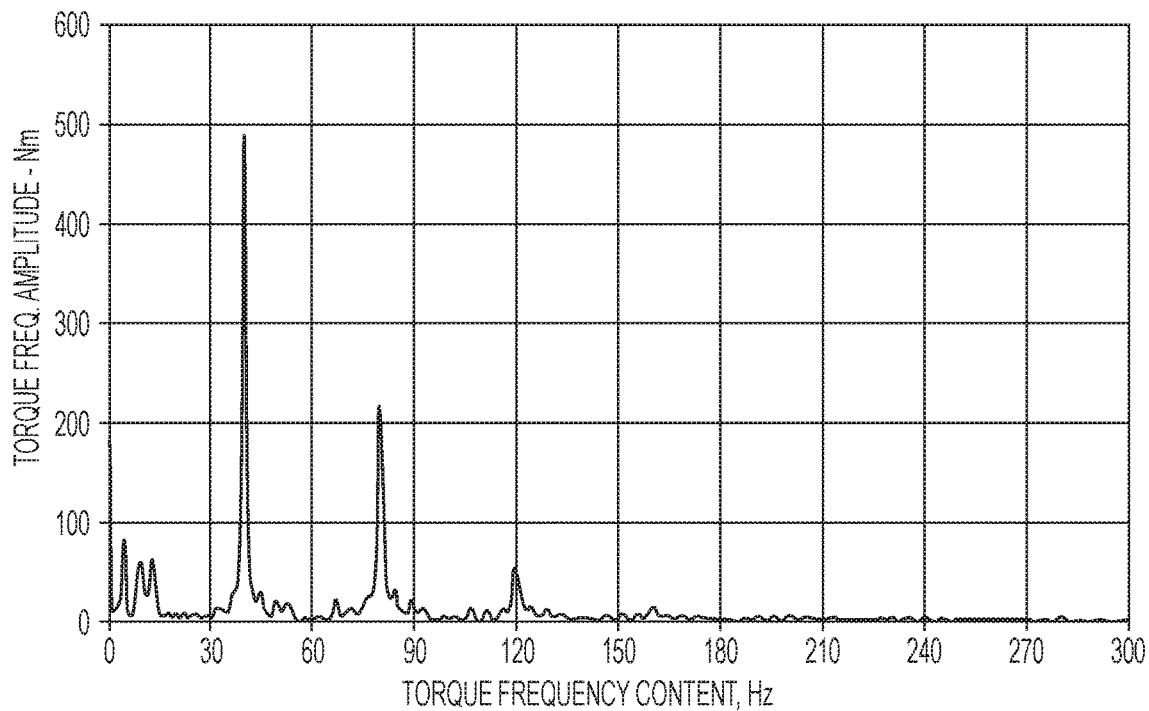

An engine running a similar combination to the previous strategy where 4 cylinders are running the 12-stroke deactive mode and 2 cylinders are running the 4-stroke mode, the torque output will be about 50% of the full 6 cylinder power case. This strategy keeps 2 of the 6 cylinder firing in their normal 4 stroke mode (cylinders 2 & 5 in this case) but the other 4 cylinders operate in the 12 stroke deactive mode, noting that cylinders 1 & 6 are out of phase by 1080 degrees and cylinders 3 & 4 are out of phase by 1080 degrees. FIG. 10E shows the firing sequence for this strategy with 14 fuel injections and thus power strokes which equates to a power output of about 10/18=~56% for this strategy. FIG. 10F shows that the primary forcing function frequency profiles of this strategy approximates the baseline of primary forcing function frequency profiles. The first order primary forcing function frequency profile is slightly lower than FIG. 10C, and closer to the baseline first order primary forcing function frequency profile. The minor amplitudes and the lower frequencies and between the primary forcing function frequency profiles are small enough not to cause destructive resonance.

In yet another alternative, the 12-stroke deactive mode of FIGS. 10D & 10E can be applied to 4 cylinders while the remaining two are in CDA mode. The pressure profiles indicate that the engine is stable enough to yield a ~22% power setting.

Table 2 provides a summary of the number of cylinders operating in 4-stroke active operation mode or 12-stroke deactive mode and the resulting aggregate torque output (percentage of maximum possible power output).

TABLE 2

| Cylinders operating in 4 stroke mode | Cylinders operating in 12 stroke mode | Output Power of Max Possible Power |
|---|---|---|
| None | 1-5-3-6-2-4 | 33% |
| 5-3-2-4 | 1-6 | 78% |
| 5-2 | 1-3-6-4 | 56% |

There are many other strategies that could be used to get various power levels and yet maintain forcing function frequency profiles similar to that of the baseline 6 cylinder engine. The primary driver to this strategy is to maintain vibration profiles similar to the baseline operation of the engine.

This strategy is most advantageous for diesels since diesels do not have to optimize the power setting with the number of activate operation mode vs deactive mode cylinders. One can choose the number of deactive cylinders and then use the fuel injection flow rate to control the exact power setting in which the engine has to operate without losing much efficiency. In a gasoline engine, the fuel injection of the active operation mode cylinders is not so flexible. The fuel must be stoichiometric, and this restricts the ability to apply partial power pulses to the cylinders.

The application has been explained thus far for a 6-cylinder engine, but it is to be understood that the principles can be applied to other engines, such as 4, 8, or 10 cylinder engines.

Variants of the above teachings can be combined to remediate otherwise noisy CDA modes or noisy deactive operation modes. For example, the teachings of FIGS. 6, 8, 9A and 10B can be drawn upon to result in combinations of cold charge capture techniques with hot charge capture techniques. In the context of a 4-cylinder engine, FIG. 11 shows such a combination.

Figure 11:
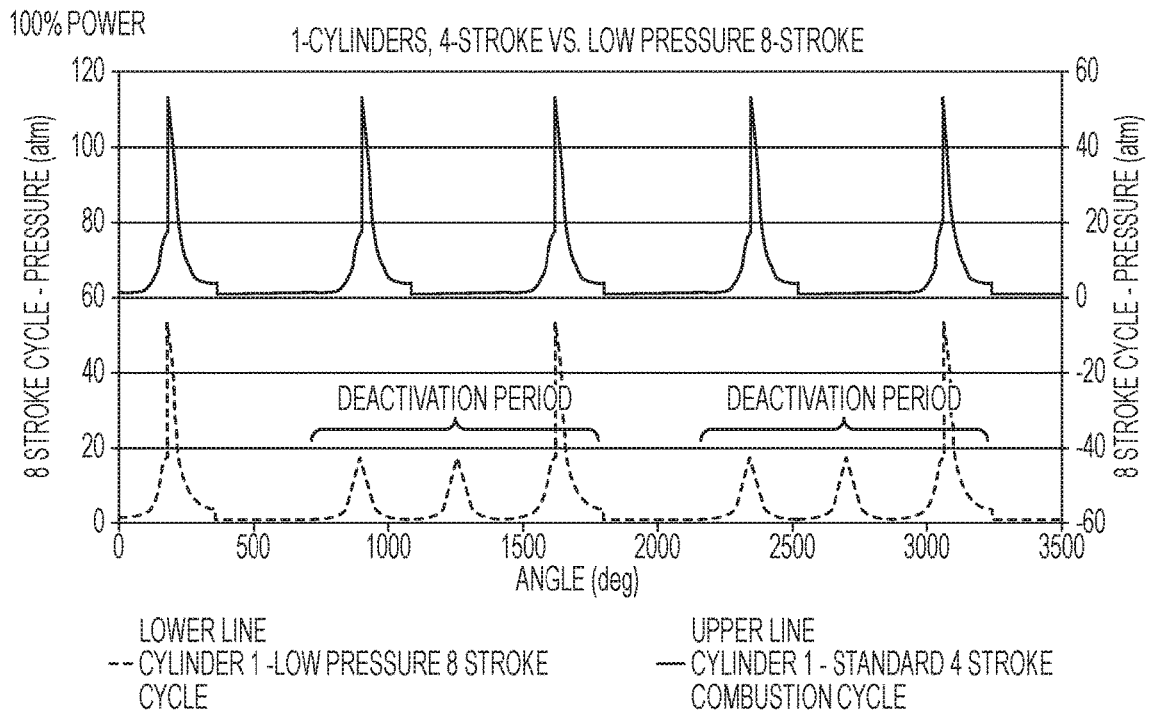
FIG. 11 illustrates a cold charge (low pressure) 8-stroke deactive mode.

An alternative 8-stroke deactive mode strategy is shown in FIG. 11 and stroke explanation is given in Table 3. In this case the beginning of the cycle, strokes 1-4, are exactly the same as the 4-stroke cycle. The gas mixture compresses to about TDC and then the fuel air mixture in the cylinder is ignited. For the next stroke the exhaust valve 150 will open and exhaust the burned gases, and then the intake valve 130 will open to ingest a fresh air-charge. Then the firing sequence changes to the alternative strategy. For the next 4 piston strokes the valves are deactivated and the gases are held in cylinder to pressurize and depressurize at traditional cylinder deactivating pressures. After the last two strokes, the cylinder deactivation is turned off for the given cylinder so that the intake and exhaust valves will be active again and then the low pressure 8-stroke deactive mode starts over again.

TABLE 3

| Stroke | Deg. | Intake | Exhaust | |
|---|---|---|---|---|
| $1^{st}$ | 0-180 | BaseCircle | BaseCircle | Traditonal compression stroke which occurs after a full air intake charge |
| $2^{nd}$ | 180-360 | BaseCircle | BaseCircle | Standard ignition & power stroke which provides the power to drive the crankshaft |
| $3^{rd}$ | 360-540 | Active | Active | Standard exhaust stroke which exhaust the trapped burned gases through exhaust valves |
| $4^{th}$ | 540-720 | Active | Active | Standard intake stroke which ingests a full charge of fresh air |
| $5^{th}$ | 720-900 | Deactive | Deactive | re-compression stroke which compresses the trapped burned gases |
| $6^{th}$ | 900-1080 | Deactive | Deactive | re-expansion stroke which expands the previously compressed burned gases |
| $7^{th}$ | 1080-1260 | BaseCircle | BaseCircle | re-compression stroke which compresses the trapped burned gases |
| $8^{th}$ | 1260-1440 | BaseCircle | BaseCircle | re-expansion stroke which expands the previously compressed burned gases |

Figure 12:
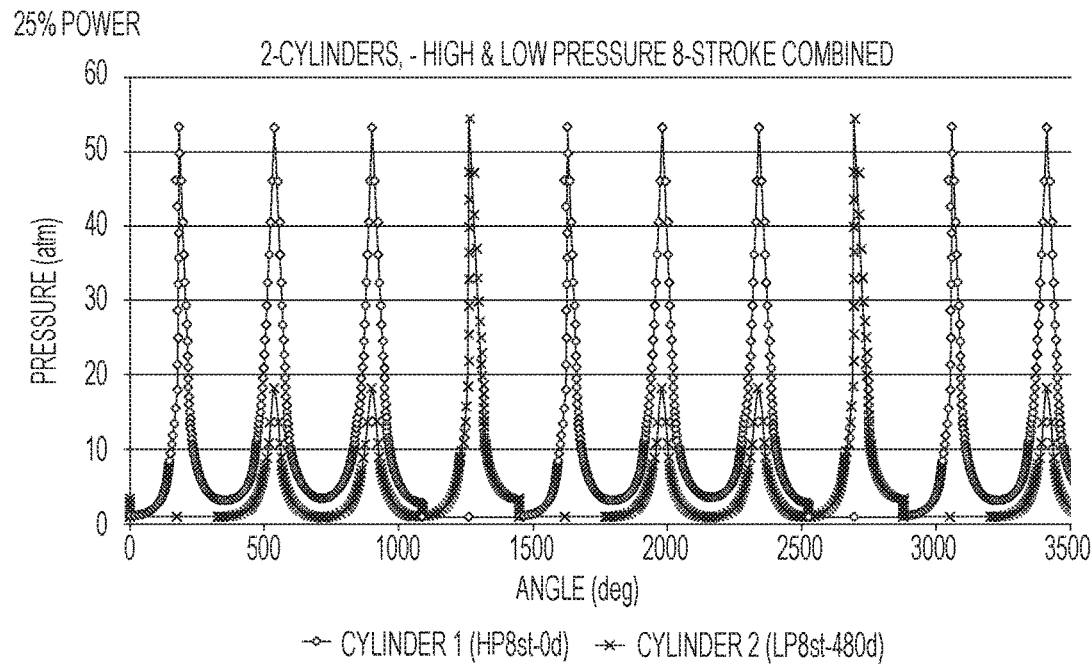
FIG. 12 illustrates a combination of cold and hot charge 8-stroke deactive modes.

FIG. 12 presents the combination of the high & low pressure 8-stroke strategies when the timing is phased appropriately to provide a consistent pressure profile strategy.

Figure 13:
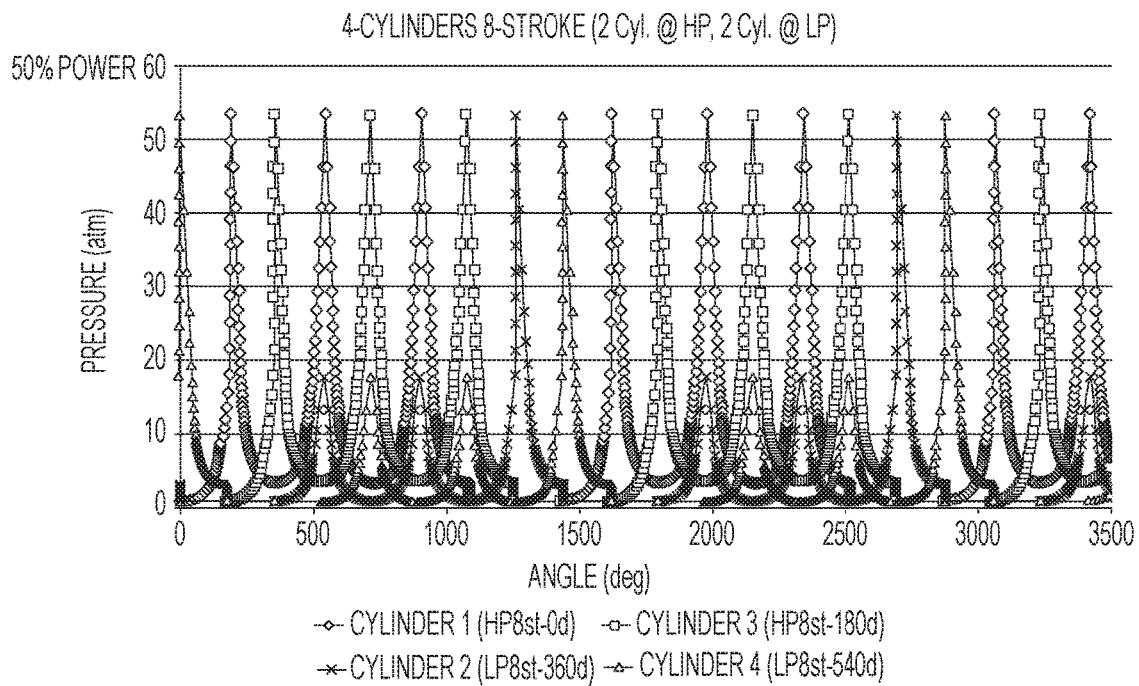
FIGS. 13 & 14 illustrate 8-stroke deactive modes for a 4-cylinder engine.

When all 4-cylinders use the high and low pressure profiles of FIG. 12, the sum of the forcing function frequency profiles of the cylinders looks very similar to a standard 4-stroke 4-cylinder engine that is operating at full power only in this case, the torque output is reduced from 100% to 50% power. This is seen in FIG. 13.

Figure 14:
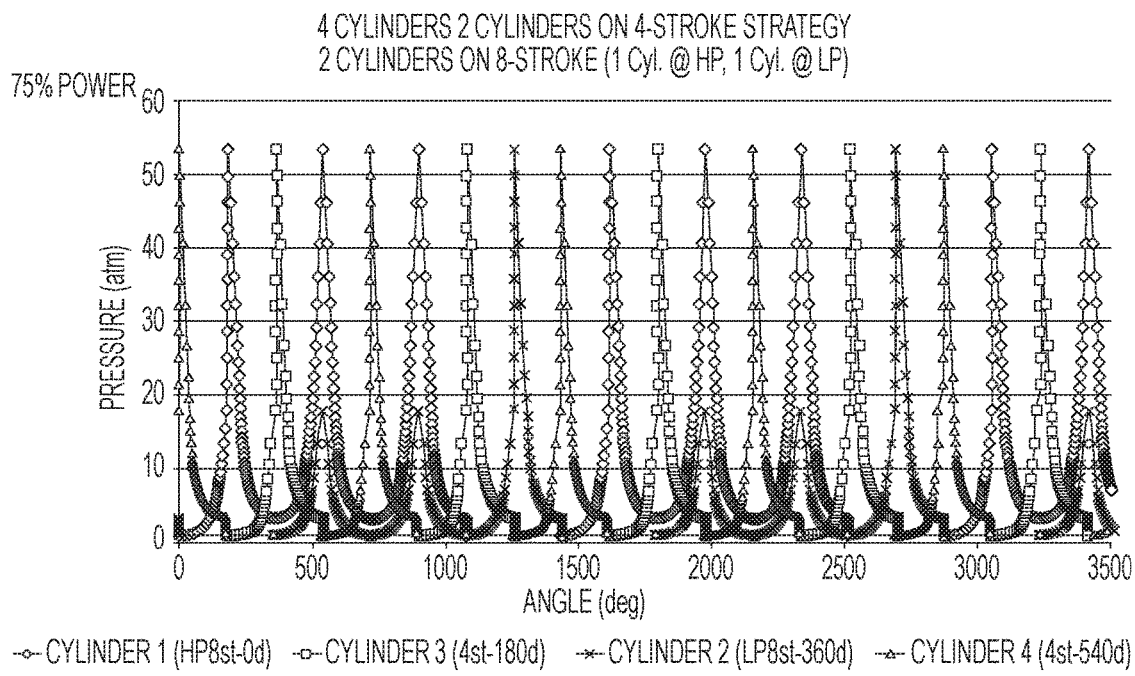

When 2 cylinders are operating on the standard 4-stroke active operation mode and are combined with 2-cylinders operating on the high and low pressure 8-stroke deactive mode, the pressure profile also looks very similar to a standard 4-stroke 4-cylinder engine. And in this case, it is producing 75% power instead of full power. This is seen in FIG. 14.

Figure 15:
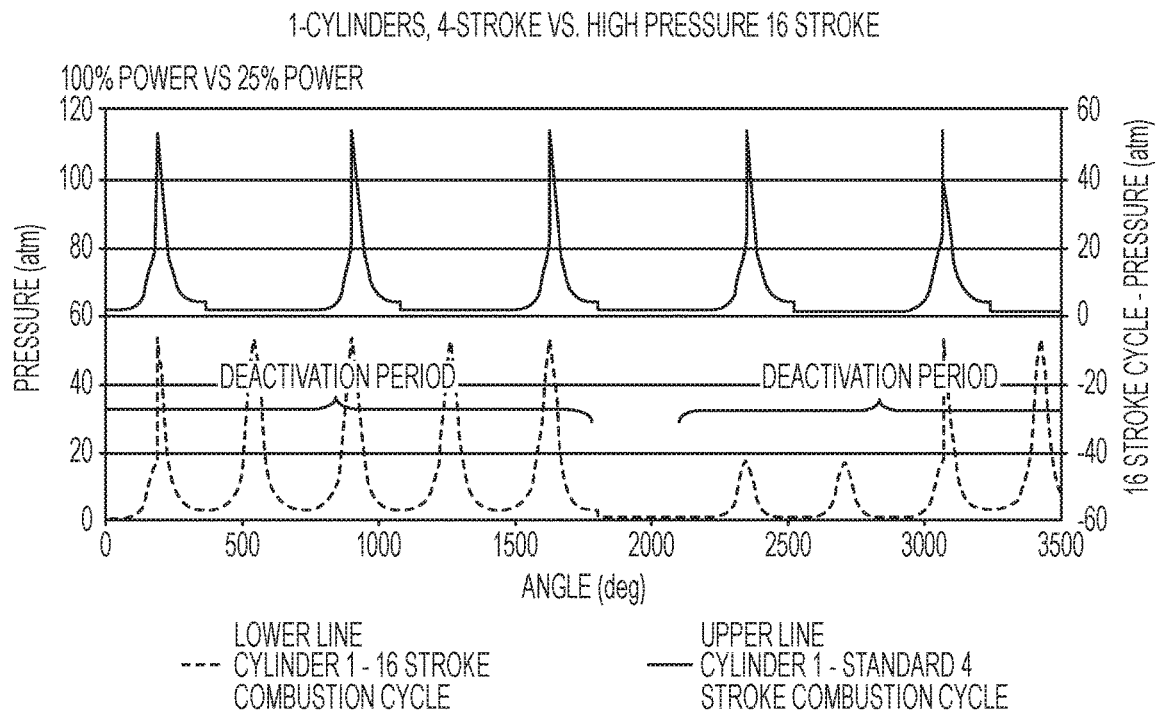
FIGS. 15-18 illustrate predominantly high pressure (hot charge) and predominantly low pressure (cold charge) 16-stroke deactive modes and combinations thereof.
Figure 16:
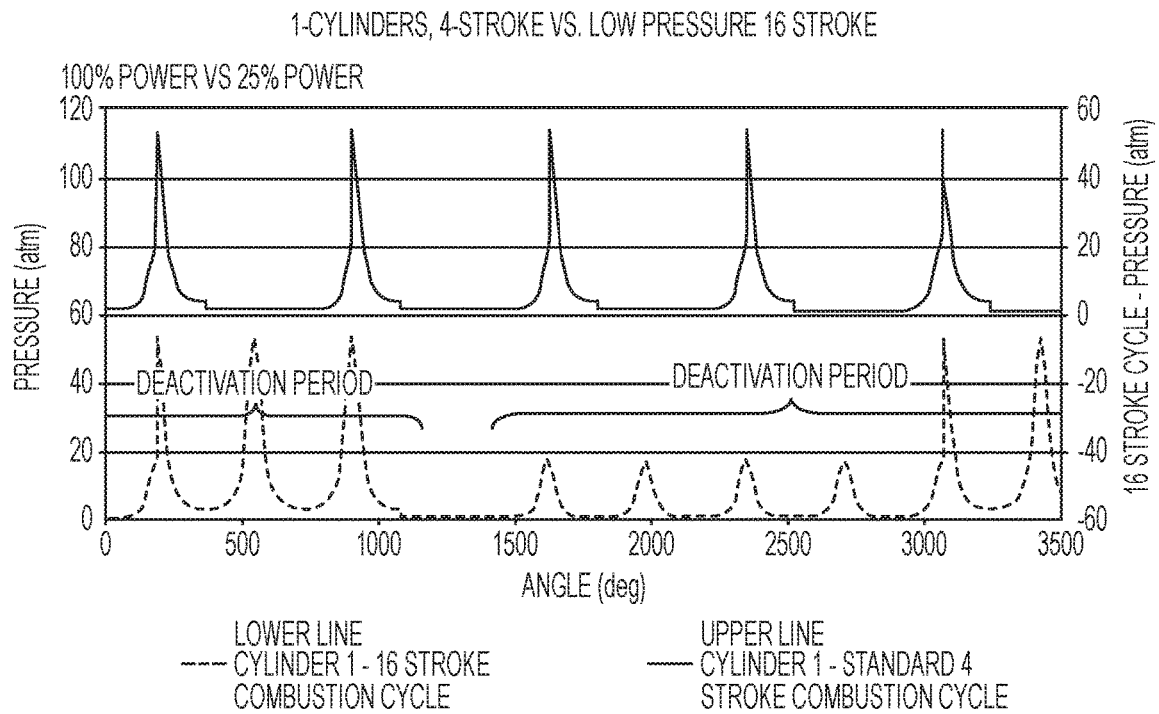
Figure 17:
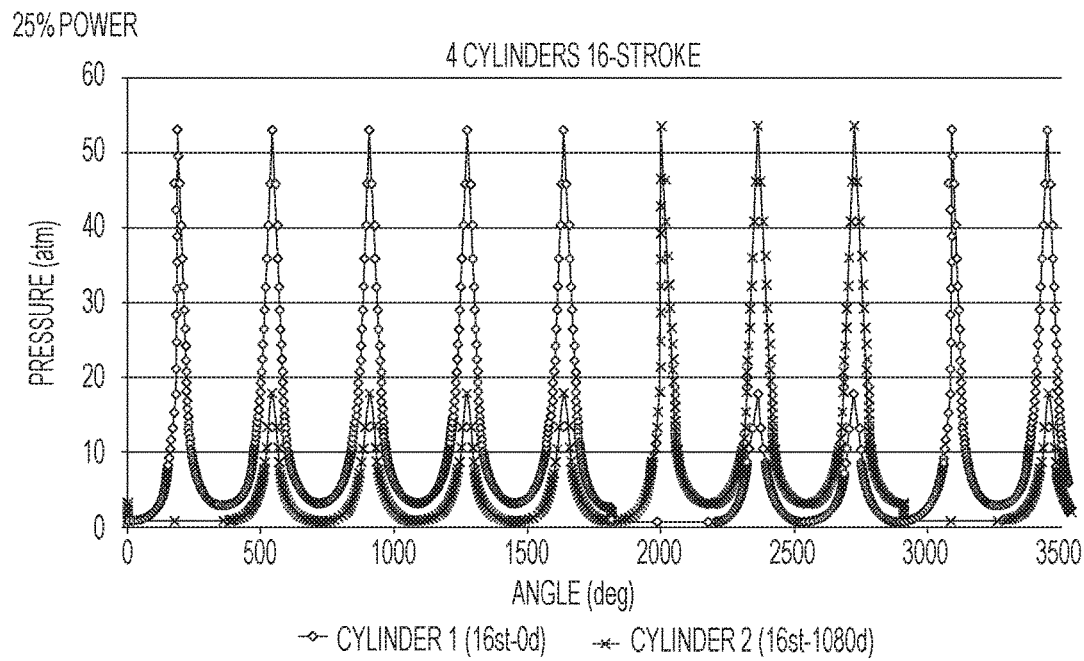
Figure 18:
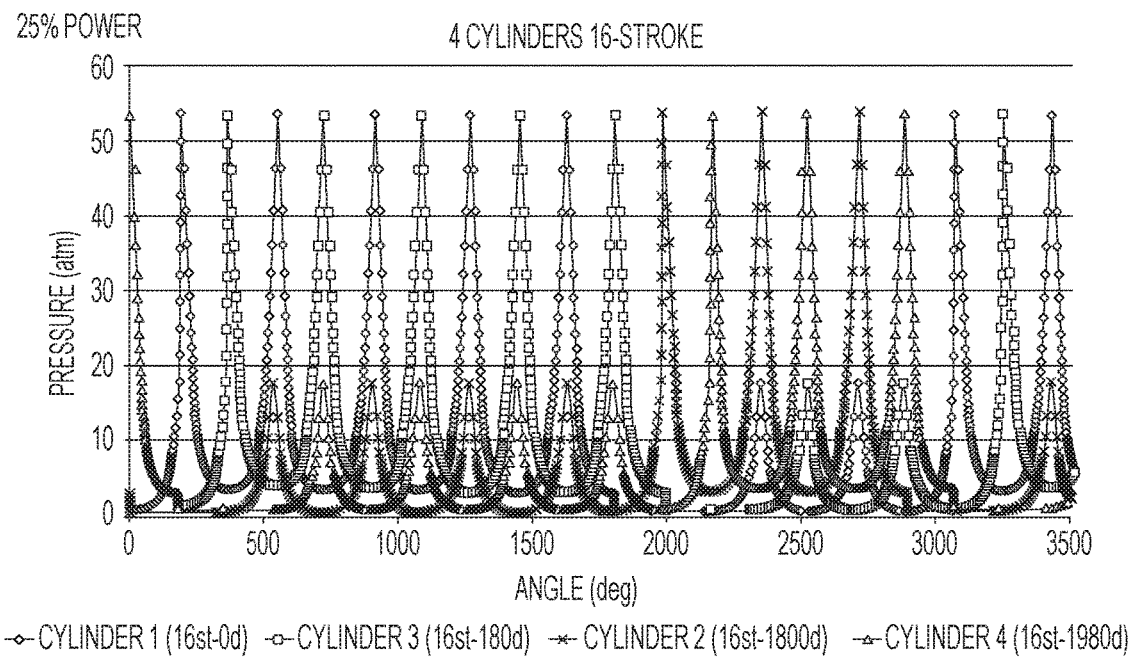

The concepts extend to 12-stroke and 16-stroke deactive modes, in both high and low pressure and hybrid high/low strategies. An example of a high pressure 16-stroke deactive mode is shown in FIG. 15. An example of a low pressure 16-stroke deactive mode is shown in FIG. 16. The combination of the two strategies is shown for two cylinders in FIG. 17, and for all four cylinders in FIG. 18. Such a combination results in acceptable primary forcing function frequency profiles commensurate with above strategies that approximate or replicate the baseline of primary forcing function frequency profiles.

To summarize, Table 4 provides torque outputs for various combinations of deactive stroke modes and 4-cylinder active operation modes for a 4-cylinder engine.

TABLE 4

| Cylinders operating in 4 stroke mode | Cylinders operating in Multi-stroke mode | Stroke Mode | Toque Output (% Power of Max |
|---|---|---|---|
| 1-3-2-4 | None | | 100% |
| 3-4 | 1-2 | 8 | 75% |
| 3-4 | 1-2 | 12 | 66% |
| 3-4 | 1-2 | 16 | 62.5% |
| None | 1-3-2-4 | 8 | 50% |
| None | 1-3-2-4 | 12 | 33% |
| None | 1-3-2-4 | 16 | 25% |

The strategies permit the operation of the engine so as to adjust the multiple strokes for a given power setting. In some cases, like Table 5, all cylinders are running the same deactive stroke mode. But it is possible to mix and match these multi-stroke strategies to get power settings in-between the ones presented on the above tables. For example, if cylinders 3 & 4 were operating on 12 stroke deactive mode and cylinders 1 & 2 were on a 16-stroke deactive mode, then the power output would be 33/2+25/2=29%. Table 6 provides additional examples.

TABLE 5

| Cylinders operating in Multi-stroke mode | Stroke Mode | Output Power of Max Possible Power |
|---|---|---|
| 1-3-2-4 | 4 | 100% |
| 1-3-2-4 | 8 | 50% |
| 1-3-2-4 | 12 | 33% |
| 1-3-2-4 | 16 | 25% |
| 1-3-2-4 | 20 | 20% |
| 1-3-2-4 | 24 | 17% |

TABLE 6

| Cylinders operating in Multi-stroke mode | | Power Calculation | Max Possible Power |
|---|---|---|---|
| 1-2 | 3-4 | | |
| 4 | 4 | | 100% |
| 4 | 8 | 100/2 + 50/2= | 75% |
| 4 | 12 | 100/2 + 33/2= | 66% |
| 4 | 16 | 100/2 + 25/2= | 62.5% |
| 4 | 20 | 100/2 + 20/2= | 60% |
| 4 | 24 | 100/2 + 17/2= | 58.5% |
| 8 | 8 | 100/2= | 50% |
| 8 | 12 | 50/2 + 33/2= | 41.5% |
| 8 | 16 | 50/2 + 25/2= | 37.5% |
| 8 | 20 | 50/2 + 20/2= | 35% |
| 8 | 24 | 50/2 + 17/2= | 33.5 |
| 12 | 12 | 100/3= | 33% |
| 12 | 16 | 33/2 + 25/2= | 29% |
| 12 | 20 | 33/2 + 20/2= | 26.7% |
| 12 | 24 | 33/2 + 17/2= | 25% |
| 16 | 16 | 100/4= | 25% |
| 16 | 20 | 25/2 + 20/2= | 22.5% |
| 16 | 24 | 25/2 + 17/2= | 21% |
| 20 | 20 | 100/5= | 20% |
| 20 | 24 | 20/2 + 17/2= | 18.5% |
| 24 | 24 | 100/6= | 17% |

Tables 5 & 6 were modeled on a 4 cylinder engine configuration. If one were using a 6 cylinder or 8 cylinder engine, then there could be many more combinations. For example, on the 6 cylinder engine, 2 cylinders could be operating in 4-stroke mode, 2 cylinder in 8-stroke mode, and 2 cylinders in 12-stroke mode. For the 8-cylinder engine one can see that there is even more combinations possible.

Figure 19:
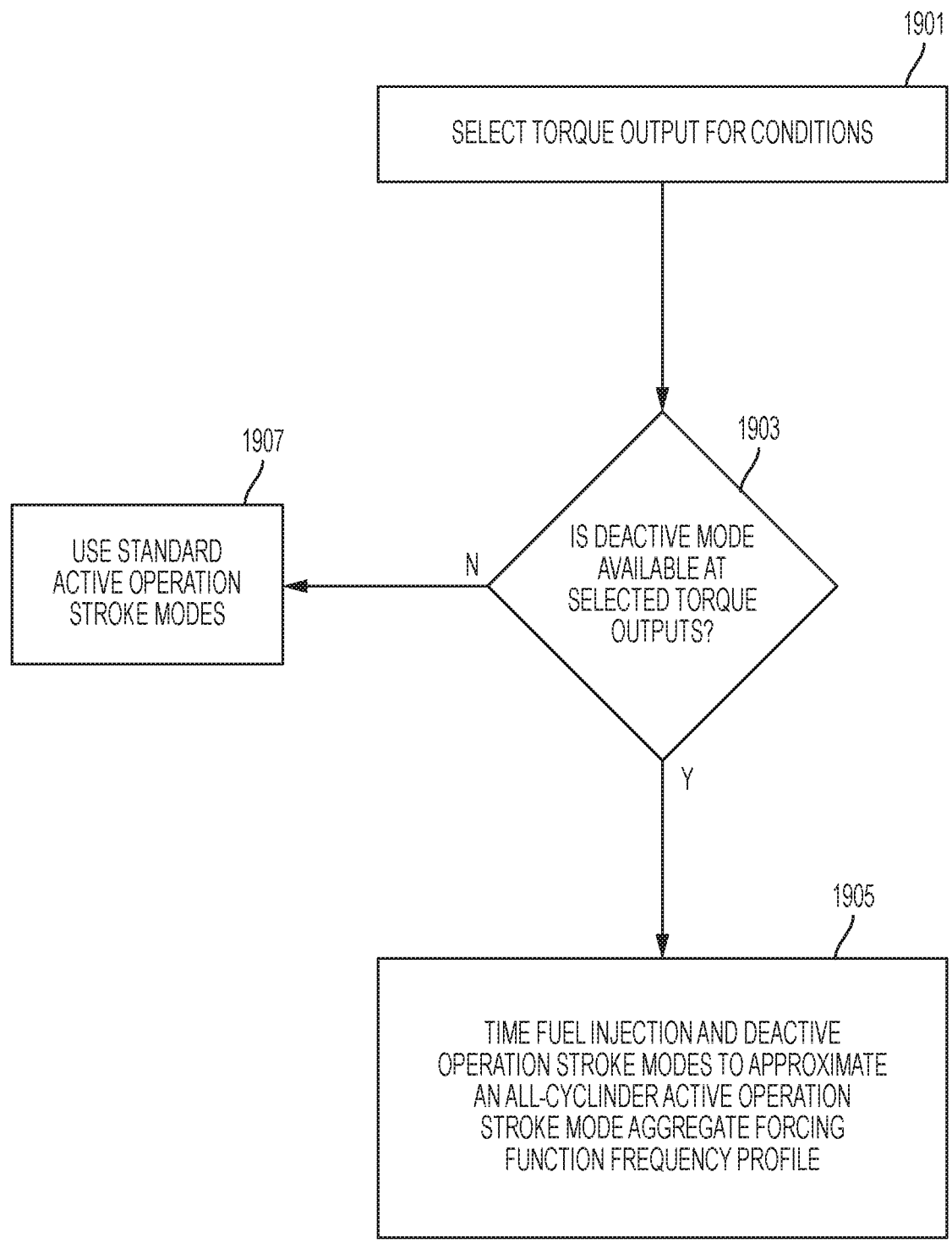
FIG. 19 is a flow diagram illustrating the selection of a deactive mode to meet torque output conditions.

FIG. 19 is a flow diagram illustrating the selection of a deactive mode to meet torque output conditions. In step 1901, computer controller 1400 selects the torque output for conditions. These can be based on the load, demand, crankshaft RPMs, etc. and the torque output can be determined by processing the sensor data in FIG. 2 in the torque output controller 700 in processor 1403. In box 1903, it must be determined if deactive mode is available at the selected torque output. This can be done as by referencing one or more lookup tables (LUTs) such as one of the Tables 1-6 outlined above. If a deactive mode is available at the requested torque output, such as when full power output is not needed, then a deactive stroke mode can be selected and the fuel injection and deactive operation stroke mode can be timed to approximate an all-cylinder active operation stroke mode aggregate forcing function frequency profile as in step 1905. So, it is possible to approximate only the baseline primary forcing function frequency profiles, or it is possible to approximate the totality of the baseline forcing function frequency profile. Such approximation matching of the totality can be achieved as by boosting the intake or implementing a adjusted valve timing.

If, for example, the crankshaft RPMs are too high or too low to avoid a mechanical resonance using the deactive mode, or the torque output required is out of range of the deactive modes, then the process proceeds to step 1907 to use a standard active operation stroke mode.

Since step 1901 is a selection step, it is possible to select a torque output with a compatible deactive mode available that is greater than the required torque output. Then, torque can be "lost" downstream, as to a driveline component or auxiliary device such as an alternator or battery charging device.

Figure 20:
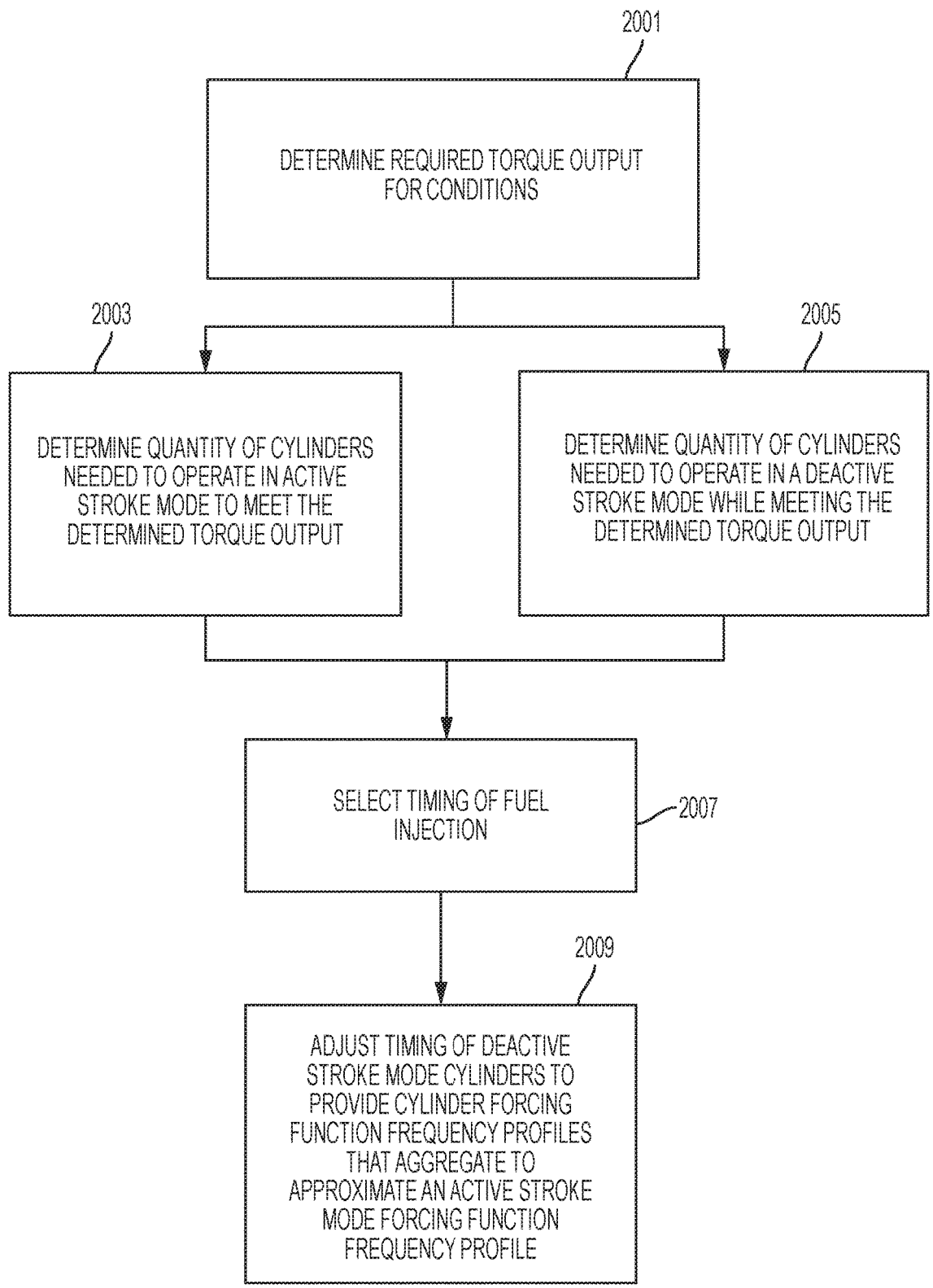
FIG. 20 is a flow diagram illustrating selection of active operation mode cylinders and deactive mode cylinders.

FIG. 20 is a flow diagram illustrating selection of active operation mode cylinders and deactive mode cylinders. Step 2001 can be done similarly to step 1901 to determine the required torque output for the operating conditions. In step 2003, processor 1403 can process data, as by the VVA controller 200, to determine the quantity of cylinders needed to operate in active stroke mode to meet the determined torque output. And, step 2005 can similarly rely on processor 1403 and collected data to determine the quantity of cylinders needed to operate in a deactive stroke mode while meeting the determined torque output. Steps 2003 and 2005 can be real-time calculations, or they can be look-up steps, accessing stored data such as that in Tables 1-6 above. With the cylinders assigned to active operation mode or deactive mode to meet the required power setting, the firing sequence can then be set. Cold charge capture and hot charge capture can be assigned and distributed. So, step 2007 can select the timing of fuel injection in accordance with the determined active operation modes and hot or cold charge deactive modes. VVA controller 200 and fuel controller 300 then adjust the timing or deactive stroke mode cylinders to provide cylinder forcing function frequency profiles that aggregate to approximate an active stroke mode forcing function frequency profile, such as the baseline primary forcing function frequency profiles, as in step 2009.

Figure 21:
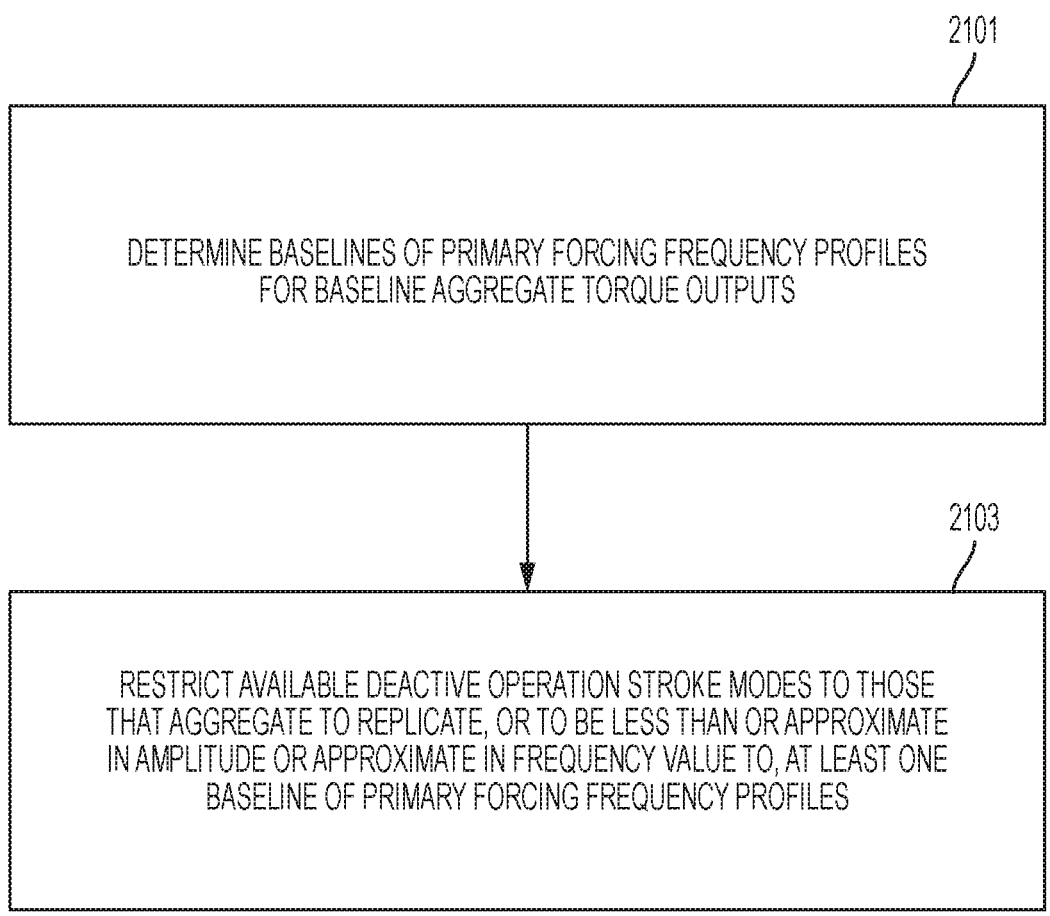
FIG. 21 is a flow diagram for restricting available deactive modes.

FIG. 21 is a flow diagram for restricting available deactive modes. In step 2101, baselines of primary forcing frequency profiles are determined for baseline aggregate torque outputs. This is done for each rotation per minute of the engine crankshaft and even for each power setting of the engine, similar to that done for the 6-cylinder, 800 RPM example above in FIGS. 1A-1C. Then, in step 2103, deactive operation modes are restricted as by prohibiting CDA modes or deactive modes that do not aggregate to replicate, or to be less than or approximate in amplitude or approximate in frequency value to, at least one baseline of primary forcing frequency profiles.

Adjusting valve timing can comprise Early Intake Valve Opening (EIVO), Early Intake Valve Closing (EIVC), Late Intake Valve Opening (LIVO), Late Intake Valve Closing (LIVC), Early Exhaust Valve Opening (EEVO), Early Exhaust Valve Closing (EEVC), Late Exhaust Valve Opening (LEVO), Late Exhaust Valve Closing (LEVC), a combination of intake valve actuation timing and exhaust valve actuation timing, such as EEVC with LIVO, or adjustments such as (Negative Valve Overlap (NVO)).

Other implementations will be apparent to those skilled in the art from consideration of the specification and practice of the examples disclosed herein.

What is claimed is:

1. A method for managing forcing function frequency profiles during operation of a multi-cylinder engine, each cylinder of the engine comprising a respective variable cylinder torque output which provides a corresponding forcing function frequency profile, the engine comprising a variable aggregate torque output comprising the sum of the cylinder torque outputs of each of the cylinders and comprising the sum of the forcing function frequency profiles of each of the cylinders, and the engine comprising a respective baseline aggregate torque output for each nonzero reciprocation speed of a reciprocating piston assembly coupled to the cylinders, wherein each respective baseline aggregate torque output provides a respective baseline of primary forcing function frequency profiles, and wherein the respective baseline aggregate torque output corresponds to active operation modes for each cylinder, where active operation modes comprise sequential actuation of an intake valve, a fuel injector, and an exhaust valve for each cylinder, the method comprising:

selecting a first stroke mode for a first cylinder, the first stroke mode comprising at least a sequential deactive operation of respective opening and respective closing of a corresponding first intake valve and a corresponding first exhaust valve during at least two reciprocations of a corresponding first reciprocating piston of the reciprocating piston assembly operating within the first cylinder;

selecting a second stroke mode for a second cylinder, the second stroke mode comprising at least a sequential active operation of respective opening and respective closing of a corresponding second intake valve and a corresponding second fuel injector during at least a first reciprocation and during a second reciprocation of a corresponding second reciprocating piston of the reciprocating piston assembly operating within the second cylinder;

operating the first stroke mode and the second stroke mode to form a first aggregate torque output that provides a sum of the forcing function frequency profiles of each of the cylinders that is less than or approximate in amplitude and approximate in frequency value to a first baseline of primary forcing function frequency profiles of a first baseline aggregate torque output.

2. The method of claim 1, comprising operating the engine at a first reciprocation speed of the reciprocating piston assembly, wherein the first baseline aggregate torque output corresponds to an aggregate torque output of the engine at a second reciprocation speed of the reciprocating piston assembly.

3. The method of claim 1, wherein the selected second stroke mode further comprises transitioning sequentially from the active operation of the corresponding second intake valve and the second fuel injector to a deactive operation of the respective opening and respective closing of a corresponding second exhaust valve and the second intake valve during a third reciprocation and during a fourth reciprocation of the second reciprocating piston, wherein the second exhaust valve does not open between the active operation of the second intake valve and the deactive operation of the second exhaust valve.

4. The method of claim 3, further comprising actively injecting fuel in to the second cylinder during the deactivate operation of the second exhaust valve and the second intake valve.

5. The method of claim 1, wherein the selected first stroke mode further comprises sequentially transitioning from the sequential deactive operation on the at least two reciprocations of the first reciprocating piston to an active operation of the respective opening and respective closing of the first exhaust valve on a subsequent reciprocation of the first reciprocating piston, wherein the sequential transitioning occurs without opening the first intake valve.

6. The method of claim 5, further comprising combusting fuel in the first cylinder prior to the deactive operation of the first stroke mode, wherein the exhaust valve remains closed after the fuel combustion.

7. The method of claim 5, further comprising actively injecting fuel in to the first cylinder during the deactivate operation of the first intake valve and the first exhaust valve.

8. The method of claim 1, wherein the first reciprocating piston is associated with the second reciprocating piston to move in synchrony with the second reciprocating piston from a top dead center alignment within the reciprocating piston assembly to a bottom dead center alignment within the reciprocating piston assembly.

9. The method of claim 1, wherein the first reciprocating piston is associated with the second reciprocating piston so that the first reciprocating piston moves from a top dead center alignment within the reciprocating piston assembly to a bottom dead center alignment within the reciprocating piston assembly as the second reciprocating piston moves from the bottom dead center alignment within the reciprocating piston assembly to the top dead center alignment within the reciprocating piston assembly.

10. The method of claim 1, wherein operating the first stroke mode and the second stroke mode to form a first aggregate torque output further comprises offsetting a first cylinder torque output of the first cylinder from a second cylinder torque output of the second cylinder so that a primary amplitude of the forcing function frequency profile of the first cylinder torque output does not coincide with a primary amplitude of the forcing function frequency profile of the second cylinder torque output.

11. The method of claim 1, wherein operating the first stroke mode and the second stroke mode to form a first aggregate torque output comprises overlapping a first cylinder torque output of the first cylinder with a second cylinder torque output of the second cylinder so that a primary amplitude of the forcing function frequency profile of the first cylinder torque output coincides with a primary amplitude of the forcing function frequency profile of the second cylinder torque output.

12. The method of claim 1, wherein the cylinders of the engine are divided in to at least a first set of cylinders and a second set of cylinders, wherein the first cylinder is in the first set of cylinders, wherein all cylinders in the first set of cylinders follow a same first firing sequence, wherein the second cylinder is in the second set of cylinders, wherein all cylinders in the second set of cylinders follow a same second firing sequence, wherein the method further comprises:

operating the second stroke mode to provide a larger forcing function frequency profile for each cylinder in the second set of cylinders than the forcing function frequency profile for each cylinder in the first set of cylinders by implementing a second firing sequence that combusts fuel during the deactive operation of the first stroke mode.

13. The method of claim 12, further comprising:

operating the second stroke mode to transition from the active operation of the respective opening and the respective closing of the corresponding second intake valve to a deactive operation of the respective opening and the respective closing of the corresponding second intake valve; and operating the first stroke mode to provide a larger forcing function frequency profile for each cylinder in the first set of cylinders than the forcing function frequency profile for each cylinder in the second set of cylinders by implementing a first firing sequence that combusts fuel during the deactive operation of the second stroke mode.

14. The method of claim 12, further comprising:

operating the second stroke mode to transition from the active operation of the respective opening and the respective closing of the corresponding second intake valve to a deactive operation of the respective opening and the respective closing of the corresponding second intake valve; and operating the first stroke mode to provide a larger forcing function frequency profile for each cylinder in the first set of cylinders than the forcing function frequency profile for each cylinder in the second set of cylinders by implementing a first firing sequence that combusts fuel prior to the deactive operation of the second stroke mode.

15. The method of claim 1, wherein the cylinders of the engine are divided in to at least a first set of cylinders and a second set of cylinders, wherein the first cylinder is in the first set of cylinders, wherein all cylinders in the first set of cylinders follow a same first firing sequence, wherein the second cylinder is in the second set of cylinders, wherein all cylinders in the second set of cylinders follow a same second firing sequence, wherein a stroke comprises one half of a reciprocation of the corresponding reciprocating piston, and wherein the method further comprises:
    operating the first stroke mode to provide an 8-stroke first firing sequence wherein the corresponding intake valve is opened and closed on a first stroke, wherein the corresponding fuel injector is deactivated on the first stroke through a third stroke, wherein the corresponding fuel injector is activated on a fourth stroke, wherein the corresponding exhaust valve is held closed from the first stroke until the eighth stroke, wherein the corresponding exhaust valve is opened and closed on the eighth stroke, and wherein the corresponding intake valve is held closed from the second stroke through the eighth stroke; and
    operating the second stroke mode to provide an 8-stroke second firing sequence identical to the first firing sequence;
    timing the second stroke mode to provide the second firing sequence so that the second stroke of the second firing sequence occurs during the sixth stroke of the first firing sequence.

16. The method of claim 15, further comprising activating the corresponding fuel injector on the sixth stroke of first firing sequence.

17. The method of claim 1, wherein the cylinders of the engine are divided in to at least a first set of cylinders and a second set of cylinders, wherein the first cylinder and a third cylinder are in the first set of cylinders, wherein the first cylinder and the third cylinder follow a same first firing sequence, wherein the second cylinder is in the second set of cylinders, wherein all cylinders in the second set of cylinders follow a same second firing sequence, wherein a stroke comprises one half of a reciprocation of the corresponding reciprocating piston, and wherein the method further comprises:
    configuring the first stroke mode to provide a 12-stroke first firing sequence wherein the corresponding intake valve is opened and closed on a first stroke, wherein the corresponding fuel injector is deactivated on the first stroke through a fifth stroke, wherein the corresponding fuel injector is activated on a sixth stroke, wherein the corresponding exhaust valve is held closed from the first stroke through an eleventh stroke, wherein the corresponding exhaust valve is opened and closed on a twelfth stroke, and wherein the corresponding intake valve is held closed from the second stroke through the twelfth stroke;
    timing the operation of the first stroke mode on the first cylinder and on the third cylinder so that the first stroke of the first stroke mode of the third cylinder occurs during the seventh stroke of the first stroke mode of the first cylinder;
    configuring the second stroke mode on the second cylinder to provide a 4-stroke second firing sequence wherein the corresponding second intake valve opens and closes on a first stroke, the fuel injector is activated on the second stroke, and the corresponding second exhaust valve opens and closes on the fourth stroke; and
    timing the operation of the second stroke mode to provide the second firing sequence so that the second stroke of the second firing sequence occurs between the sixth stroke of the first firing sequence of the first cylinder and the second stroke of the first firing sequence of the third cylinder.

18. The method of claim 17, further comprising activating the corresponding fuel injector on one or both of an eighth stroke and a tenth stroke.

19. The method of claim 1, wherein the cylinders of the engine are divided in to at least a first set of cylinders and a second set of cylinders, wherein the first cylinder is in the first set of cylinders, wherein all cylinders in the first set of cylinders follow a same first firing sequence, wherein the second cylinder is in the second set of cylinders, wherein all cylinders in the second set of cylinders follow a same second firing sequence, wherein a stroke comprises one half of a reciprocation of the corresponding reciprocating piston, and wherein the method further comprises:
    operating the first stroke mode to provide an 8-stroke first firing sequence wherein the corresponding intake valve is opened and closed on a first stroke, wherein the corresponding fuel injector is deactivated on the first stroke through a fifth stroke and on a seventh stroke through an eighth stroke, wherein the corresponding fuel injector is activated on a sixth stroke, wherein the corresponding exhaust valve is held closed from the first stroke until the eighth stroke, wherein the corresponding exhaust valve is opened and closed on the eighth stroke, and wherein the corresponding intake valve is held closed from the second stroke through the eighth stroke; and
    operating the second stroke mode to provide a 4-stroke second firing sequence wherein the corresponding second intake valve opens and closes on a first stroke, the fuel injector is activated on the second stroke, and the corresponding second exhaust valve opens and closes on the fourth stroke;
    timing the second stroke mode to provide the second firing sequence so that the fourth stroke of the second firing sequence occurs during the sixth stroke of the first firing sequence.

20. The method of claim 1, wherein the cylinders of the engine are divided in to at least a first set of cylinders and a second set of cylinders, wherein the first cylinder and a third cylinder are in the first set of cylinders, wherein the first cylinder and the third cylinder follow a same first firing sequence, wherein the second cylinder is in the second set of cylinders, wherein all cylinders in the second set of cylinders follow a same second firing sequence, wherein a stroke comprises one half of a reciprocation of the corresponding reciprocating piston, and wherein the method further comprises:
    configuring the first stroke mode to provide a 16-stroke first firing sequence wherein the corresponding intake valve is opened and closed on a first stroke, wherein the corresponding fuel injector is deactivated on the first stroke through a ninth stroke, wherein the corresponding fuel injector is activated on a tenth stroke, wherein the corresponding exhaust valve is held closed from the first stroke through a fifteenth stroke, wherein the corresponding exhaust valve is opened and closed on the sixteenth stroke, and wherein the corresponding intake valve is held closed from the second stroke through the sixteenth stroke;

timing the operation of the first stroke mode on the first cylinder and on the third cylinder so that the first stroke of the first stroke mode of the third cylinder occurs during the eleventh stroke of the first stroke mode of the first cylinder;

configuring the second stroke mode on the second cylinder to provide a 4-stroke second firing sequence wherein the corresponding second intake valve opens and closes on a first stroke, the fuel injector is activated on the second stroke, and the corresponding second exhaust valve opens and closes on the fourth stroke; and timing the operation of the second stroke mode to provide the second firing sequence so that the second stroke of the second firing sequence occurs between the fifteenth stroke of the first firing sequence of the first cylinder and the first stroke of the first firing sequence of the third cylinder.

21. The method of claim 20, further comprising activating the corresponding fuel injector on one or both of a twelfth stroke and a fourteenth stroke.

22. The method of claim 1, further comprising opening the corresponding first intake valve and boosting a cylinder pressure for the first cylinder prior to entering the deactive operation of the first stroke mode.

23. The method of claim 1, further comprising executing a variable valve timing event on one or both of the corresponding first intake valve or the corresponding first exhaust valve for the first cylinder prior to entering the deactive operation of the first stroke mode.

24. The method of claim 1, further comprising adjusting a first quantity of fuel used at the first reciprocation speed for the first stroke mode and for the second stroke mode to be more efficient than a second quantity of fuel used at the first reciprocation speed for generating a baseline aggregate torque output.

25. A method for managing forcing function frequency profiles during operation of a multi-cylinder engine, each cylinder of the engine comprising a respective variable cylinder torque output which provides a corresponding forcing function frequency profile, the engine comprising a variable aggregate torque output comprising the sum of the cylinder torque outputs of each of the cylinders and comprising the sum of the forcing function frequency profiles of each of the cylinders, and the engine comprising a respective baseline aggregate torque output for each nonzero reciprocation speed of a reciprocating piston assembly coupled to the cylinders, wherein each respective baseline aggregate torque provides a respective baseline of primary forcing function frequency profiles, and wherein the respective baseline aggregate torque output corresponds to active operation modes for each cylinder, where active operation modes comprise sequential actuation of an intake valve, a fuel injector, and an exhaust valve for each cylinder, the method comprising:

selecting a first stroke mode for the cylinders, the first stroke mode comprising at least a sequential deactive operation of a respective opening and a respective closing of a corresponding first intake valve and a corresponding first exhaust valve during at least two reciprocations of a corresponding reciprocating piston of the reciprocating piston assembly operating within the cylinders;

injecting fuel in to the cylinders during the deactive operation;

timing the operating of the first stroke mode on the cylinders to form a first aggregate torque output that provides a sum of the forcing function frequency profiles of each of the cylinders that is less than or approximate in amplitude and approximate in frequency value to a first baseline of primary forcing function frequency profiles of a first baseline aggregate torque output.

26. The method of claim 25, wherein the cylinders of the engine are divided in to at least a first set of cylinders comprising a first cylinder and a second set of cylinders comprising a second cylinder, wherein all cylinders in the first set of cylinders follow a first firing sequence, wherein all cylinders in the second set of cylinders follow the first firing sequence, wherein a stroke comprises one half of a reciprocation of the corresponding reciprocating piston, and wherein the method further comprises:

configuring a first stroke mode on the first cylinder and on the second cylinder to provide an 8-stroke first firing sequence wherein the corresponding intake valve is opened and closed on a first stroke, wherein the corresponding fuel injector is deactivated on the first stroke through a third stroke, wherein the corresponding fuel injector is activated on a fourth stroke, wherein the corresponding exhaust valve is held closed from the first stroke until the eighth stroke, wherein the corresponding exhaust valve is opened and closed on the eighth stroke, and wherein the corresponding intake valve is held closed from the second stroke through the eighth stroke; and timing the first stroke mode on the first cylinder and on the second cylinder to provide the first stroke of the first firing sequence of the second cylinder during a fifth stroke of the first firing sequence of the first cylinder operating the first stroke mode.

27. The method of claim 26, further comprising activating the corresponding fuel injector on the sixth stroke of the first firing sequence.

28. The method of claim 25, wherein the cylinders of the engine are divided in to at least a first set of cylinders comprising a first cylinder and a second set of cylinders comprising a second cylinder, wherein all cylinders in the first set of cylinders follow a first firing sequence, wherein all cylinders in the second set of cylinders follow the first firing sequence, wherein a stroke comprises one half of a reciprocation of the corresponding reciprocating piston, and wherein the method further comprises:

configuring a first stroke mode on the first cylinder and on the second cylinder to provide a 12-stroke first firing sequence wherein the corresponding intake valve is opened and closed on a first stroke, wherein the corresponding fuel injector is deactivated on the first stroke through a fifth stroke, wherein the corresponding fuel injector is activated on a sixth stroke, wherein the corresponding exhaust valve is held closed from the first stroke through an eleventh stroke, wherein the corresponding exhaust valve is opened and closed on the twelfth stroke, and wherein the corresponding intake valve is held closed from the second stroke through the twelfth stroke; and timing the first stroke mode on the first cylinder and on the second cylinder to provide the first stroke of the first firing sequence of the second cylinder during the seventh stroke of the first firing sequence of the first cylinder.

29. The method of claim 28, further comprising activating the corresponding fuel injector on one or both of the eighth stroke or the tenth stroke of the first firing sequence.

30. The method of claim 25, wherein the cylinders of the engine are divided in to at least a first set of cylinders comprising a first cylinder and a second set of cylinders comprising a second cylinder, wherein all cylinders in the first set of cylinders follow a first firing sequence, wherein all cylinders in the second set of cylinders follow the first firing sequence, wherein a stroke comprises one half of a reciprocation of the corresponding reciprocating piston, and wherein the method further comprises:
configuring a first stroke mode on the first cylinder and on the second cylinder to provide a 16-stroke first firing sequence wherein the corresponding intake valve is opened and closed on a first stroke, wherein the corresponding fuel injector is deactivated on the first stroke through a ninth stroke, wherein the corresponding fuel injector is activated on a tenth stroke, wherein the corresponding exhaust valve is held closed from the first stroke through a sixteenth stroke, wherein the corresponding exhaust valve is opened and closed on the sixteenth stroke, and wherein the corresponding intake valve is held closed from the second stroke through the sixteenth stroke; and
timing the first stroke mode on the first cylinder and on the second cylinder to provide the first stroke of the first firing sequence of the second cylinder during the eleventh stroke of the first firing sequence of the first cylinder.

31. The method of claim 30, further comprising activating the corresponding fuel injector on one or both of the twelfth stroke or the fourteenth stroke of the first firing sequence.

32. The method of claim 26, further comprising boosting a corresponding cylinder pressure during the first stroke.

33. A method for managing forcing function frequency profiles during operation of a multi-cylinder engine, each cylinder of the engine providing a respective variable cylinder forcing function frequency profile, the engine comprising a variable aggregate of forcing function frequency profiles summing the respective variable cylinder forcing function frequency profiles of each of the cylinders, where the aggregate of forcing function frequency profiles is variable in response to changes in the stroke modes selected for the cylinders and in response to changes in crankshaft rotations per minute, and the engine comprises a respective baseline of primary forcing function frequency profiles for each nonzero reciprocation speed of a reciprocating piston assembly coupled to the cylinders, wherein each respective baseline of primary forcing function frequency profiles corresponds to active operation modes for each cylinder, where active operation modes comprise sequential actuation of an intake valve, a fuel injector, and an exhaust valve for each cylinder, the method comprising:
determining a required torque output for the operating engine;
selecting a first stroke mode for a first cylinder, the first stroke mode comprising at least a sequential deactive operation of respective opening and respective closing of a corresponding first intake valve and a corresponding first exhaust valve during at least two reciprocations of a corresponding first reciprocating piston of the reciprocating piston assembly operating within the first cylinder;
selecting a second stroke mode for a second cylinder, the second stroke mode comprising at least a sequential deactive operation of respective opening and respective closing of a corresponding second intake valve and a corresponding second exhaust valve during at least two reciprocations of a corresponding second reciprocating piston of the reciprocating piston assembly operating within the second cylinder;
operating the first stroke mode on the first cylinder, the second stroke mode on the second cylinder, and at least a third stroke mode on the remaining cylinders to meet or exceed the required torque output and to form a first aggregate of forcing function frequency profiles that comprises primary forcing function frequency profiles that are less than or approximate in amplitude and less than or approximate in frequency value to one of the respective baseline of primary forcing function frequency profiles.

34. The method of claim 33, further comprising operating the first stroke mode on the first cylinder, the second stroke mode on the second cylinder, and at least a third stroke mode on the remaining cylinders at the same nonzero reciprocation speed of the reciprocating piston assembly as the one of the respective baseline of primary forcing function frequency profiles.

35. The method of claim 33, further comprising performing a charge intake operation on the second cylinder prior to operating the second stroke mode on the second cylinder; injecting fuel during the deactive operation of the first cylinder in the first stroke mode to increase a pressure pulse of the first cylinder; and timing the increased pressure pulse of the first cylinder to coincide with the performing of the charge intake operation on the second cylinder.

* * * * *